United States Patent
Fujiwara et al.

(10) Patent No.: US 12,307,705 B2
(45) Date of Patent: May 20, 2025

(54) IMAGE CAPTURING SYSTEM, CONTROL DEVICE, CONTROL METHOD, AND STORAGE MEDIUM

(71) Applicant: HONDA MOTOR CO., LTD., Tokyo (JP)

(72) Inventors: Takao Fujiwara, Tokyo (JP); Makoto Mitsukawa, Tokyo (JP); Katsuyuki Okubo, Tokyo (JP); Hiroaki Yoshida, Tokyo (JP); Kota Nakauchi, Tokyo (JP); Naruaki Watanabe, Tokyo (JP); Shun Fujitsu, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 557 days.

(21) Appl. No.: 17/701,092

(22) Filed: Mar. 22, 2022

(65) Prior Publication Data

US 2022/0212787 A1 Jul. 7, 2022

Related U.S. Application Data

(63) Continuation of application No. PCT/JP2020/035124, filed on Sep. 16, 2020.

(30) Foreign Application Priority Data

Sep. 27, 2019 (JP) ................................ 2019-177692

(51) Int. Cl.
G06T 7/73 (2017.01)
B64U 101/30 (2023.01)
G05D 1/00 (2024.01)

(52) U.S. Cl.
CPC ............... *G06T 7/73* (2017.01); *G05D 1/101* (2013.01); *B64U 2101/30* (2023.01); *G06T 2207/10032* (2013.01)

(58) Field of Classification Search
CPC . G06T 7/73; G06T 2207/10032; G05D 1/101; B64U 2101/30
See application file for complete search history.

(56) References Cited

U.S. PATENT DOCUMENTS

2016/0360087 A1  12/2016  Kwon et al.
2019/0019141 A1  1/2019  Torii et al.
(Continued)

FOREIGN PATENT DOCUMENTS

JP   2005-124176 A   5/2005
JP   2017-182690 A   10/2017
(Continued)

OTHER PUBLICATIONS

English Translation of WO2019198868 (PCT/KR/2018005519 of US 20210055746) (Year: 2019).*

(Continued)

*Primary Examiner* — Kyu Chae
(74) *Attorney, Agent, or Firm* — WHDA, LLP

(57) ABSTRACT

An image capturing system comprises: an unmanned aerial vehicle including an image capturing unit capable of capturing an image of a subject in a flight state; and a control device capable of communicating with a terminal of the subject and the unmanned aerial vehicle. The control device includes: a storage unit configured to register subject information in which the subject is set as a target to be captured; a determination unit configured to determine whether the subject is present in a predetermined image capturing area; a signal generation unit configured to generate a control signal that controls the image capturing unit; and a communication control unit configured to transmit the subject information and the control signal to the unmanned aerial vehicle.

20 Claims, 7 Drawing Sheets

(56) References Cited

U.S. PATENT DOCUMENTS

2019/0373405 A1* 12/2019 Jones ................. H04L 61/4511
2021/0055746 A1*  2/2021 Jeong .................. G05D 1/0016

FOREIGN PATENT DOCUMENTS

| | | | |
|---|---|---|---|
| JP | 2018-038029 A | | 3/2018 |
| JP | 2018-092237 A | | 6/2018 |
| JP | 2019145947 A | * | 8/2019 |
| WO | WO-2019198868 A1 | * | 10/2019 ........... B64C 39/024 |

OTHER PUBLICATIONS

English Translation of JP2019145947A. (Year: 2019).*
Extended European Search Report dated Oct. 14, 2022, issued in counterpart EP Application No. 20870217.5. (12 pages).
International Search Report dated Dec. 8, 2020, issued in counterpart International Application No. PCT/JP2020/035124, with English Translation. (4 pages).
Office Action dated Sep. 15, 2023, issued in counterpart CN Application No. 202080064980.5, with English Translation. (22 pages).

* cited by examiner

IMAGE CAPTURING SYSTEM, CONTROL DEVICE, CONTROL METHOD, AND STORAGE MEDIUM

CROSS-REFERENCE TO RELATED APPLICATION(S)

This application is a continuation of International Patent Application No. PCT/JP2020/035124 filed on Sep. 16, 2020, which claims priority to and the benefit of Japanese Patent Application No. 2019-177692 filed on Sep. 27, 2019, the entire disclosures of which are incorporated herein by reference.

BACKGROUND OF THE INVENTION

Field of the Invention

The present invention relates to an image capturing system, a control device, a control method, and a storage medium, and particularly relates to a technique for capturing an image of a subject registered in advance by an unmanned aerial vehicle.

Description of the Related Art

Japanese Patent Laid-Open No. 2017-182690 A discloses a technique for capturing an image of a plurality of moving objects using an autonomous flight robot.

SUMMARY OF THE INVENTION

Technical Problem

However, the technique of Japanese Patent Laid-Open No. 2017-182690 A is to capture an image of a large number of unspecified intruders or moving objects such as vehicles having intruded into a monitored space using a camera of an autonomous flight robot for the purpose of crime prevention.

When an image of a subject registered in advance is captured by an unmanned aerial vehicle, it may be necessary to capture an image by using information of the subject registered in advance.

The present invention provides a technology capable of capturing an image of a subject registered in advance by an unmanned aerial vehicle.

Solution to Problem

An image capturing system according to a first aspect of the present invention is an image capturing system including: an unmanned aerial vehicle including an image capturing unit capable of capturing an image of a subject in a flight state; and a control device capable of communicating with a terminal of the subject and the unmanned aerial vehicle, wherein
the control device includes:
a storage unit configured to register subject information in which the subject is set as a target to be captured;
a determination unit configured to determine whether the subject is present in a predetermined image capturing area, on the basis of location information of the subject acquired by communication with the terminal and map information;
a signal generation unit configured to generate a control signal that controls the image capturing unit on the basis of determination of the determination unit; and
a communication control unit configured to transmit the subject information and the control signal to the unmanned aerial vehicle, and
the unmanned aerial vehicle further includes:
an identification unit configured to identify the subject on the basis of subject information distributed from the terminal of the subject and the subject information transmitted from the communication control unit; and
an image capturing control unit configured to control the image capturing unit on the basis of the control signal to control image capturing of the subject identified by the identification unit.

The image capturing system according to a second aspect of the present invention, wherein the storage unit registers, as the subject information, group information in which users of a plurality of vehicles constituting the subject are set as a group of targets to be captured, and the determination unit determines, on the basis of location information of the subject and the map information, whether or not the subject is traveling in a predetermined image capturing area.

The image capturing system according to a third aspect of the present invention, wherein, when the determination unit determines that at least one of the plurality of vehicles set as the group has entered the image capturing area, the determination unit determines that the plurality of vehicles is traveling in the image capturing area,
the signal generation unit generates a control signal that instructs start of image capturing, and
the image capturing control unit controls the image capturing unit on the basis of the control signal to start capturing images of the group of the plurality of vehicles.

The image capturing system according to a fourth aspect of the present invention, wherein, when the determination unit determines that at least one of the plurality of vehicles is traveling in the image capturing area,
the signal generation unit generates a control signal that instructs continuation of image capturing,
the image capturing control unit controls the image capturing unit on the basis of the control signal to continue the image capturing,
when the determination unit determines that all of the plurality of vehicles have left the image capturing area,
the signal generation unit generates a control signal that instructs end of image capturing, and
the image capturing control unit controls the image capturing unit on the basis of the control signal to end the image capturing.

The image capturing system according to a fifth aspect of the present invention, wherein, when the determination unit determines that all of the plurality of vehicles set as the group have entered the image capturing area, the determination unit determines that the plurality of vehicles is traveling in the image capturing area,
the signal generation unit generates a control signal that instructs start of image capturing, and
the image capturing control unit controls the image capturing unit on the basis of the control signal to start capturing images of the group of the plurality of vehicles.

The image capturing system according to a sixth aspect of the present invention, wherein, when the determination unit determines that at least one of the plurality of vehicles has entered the image capturing area or a preparation area that is predetermined and set before the image capturing area,
the signal generation unit generates an area notification signal that notifies the users that the at least one of the plurality of vehicles has entered the image capturing area or the preparation area, and the communication control unit transmits the area notification signal to the plurality of vehicles.

The image capturing system according to a seventh aspect of the present invention, wherein the control device further includes:

an image processing unit configured to perform image processing of extracting faces of the users from image data captured by the image capturing unit; and an image determination unit configured to determine whether or not images of the faces of the users have been captured equivalent to the number of persons set as the group on the basis of a result of the image processing and the group information, and when images of the faces of the users have not been captured equivalent to the number of persons set as the group, the signal generation unit generates a parameter control signal that controls an image capturing parameter of the image capturing unit such that images of the faces of the users can be captured equivalent to the number of persons set as the group, and the image capturing control unit of the unmanned aerial vehicle controls the image capturing unit on the basis of the parameter control signal to perform the image capturing.

The image capturing system according to an eighth aspect of the present invention, wherein, when images of the faces of the users have not been captured equivalent to the number of persons set as the group in determination of the image determination unit, the signal generation unit generates an image capturing guide signal that guides the users to redo the image capturing, and the communication control unit transmits the image capturing guide signal to the plurality of vehicles.

The image capturing system according to a ninth aspect of the present invention, wherein the determination unit acquires an inter-vehicle distance of the plurality of vehicles traveling in the image capturing area or a predetermined preparation area set before the image capturing area on the basis of the location information, when the determination unit determines that the inter-vehicle distance exceeds a distance of an upper limit of a predetermined reference distance range, the signal generation unit generates a distance notification signal that notifies the users that the inter-vehicle distance exceeds the distance of the upper limit of the reference distance range, and the communication control unit transmits the distance notification signal to the plurality of vehicles.

The image capturing system according to a tenth aspect of the present invention, wherein the determination unit acquires an inter-vehicle distance of the plurality of vehicles traveling in the image capturing area or the predetermined preparation area set before the image capturing area on the basis of the location information, when the determination unit determines that the inter-vehicle distance is equal to or less than a distance of a lower limit of a predetermined reference distance range, the signal generation unit generates an approach notification signal that notifies the users that the inter-vehicle distance is equal to or less than the distance of the lower limit of the reference distance range, and the communication control unit transmits the approach notification signal to the plurality of vehicles.

The image capturing system according to an eleventh aspect of the present invention, wherein the plurality of vehicles each further includes:

an acquisition unit configured to acquire location information of the vehicle;

a vehicle communication unit configured to transmit location information of the vehicle; and a detection unit configured to detect speed information of the vehicle, the vehicle communication unit transmits the speed information to the control device, the determination unit of the control device acquires a speed difference of the plurality of vehicles traveling in the image capturing area or the predetermined preparation area set before the image capturing area on the basis of the speed information, when the determination unit determines that the speed difference exceeds predetermined reference speed, the signal generation unit generates a speed notification signal that notifies the users that the speed difference exceeds the reference speed, and the communication control unit transmits the speed notification signal to the plurality of vehicles.

The image capturing system according to a twelfth aspect of the present invention, wherein the control device further includes:

a backlight determination unit configured to determine whether or not image capturing condition is backlight condition on the basis of image data captured by the image capturing unit, and when the image capturing condition is determined to be the backlight condition, the signal generation unit generates a flight control signal that instructs a change in a flight position of the unmanned aerial vehicle such that the unmanned aerial vehicle avoids the backlight, the communication control unit transmits the flight control signal to the unmanned aerial vehicle, and a flight control unit of the unmanned aerial vehicle changes the flight position on the basis of the flight control signal.

The image capturing system according to a thirteenth aspect of the present invention, wherein, when the image capturing condition is determined to be the backlight condition, the signal generation unit generates a parameter control signal that performs control to move an angle of view of the image capturing unit in a horizontal direction or control to move the angle of view of the image capturing unit in a vertical direction, the communication control unit transmits the parameter control signal to the unmanned aerial vehicle, and the image capturing control unit of the unmanned aerial vehicle changes the angle of view of the image capturing unit on the basis of the parameter control signal.

The image capturing system according to a fourteenth aspect of the present invention, wherein the storage unit registers, as the subject information, user information in which a pedestrian or a user of a single vehicle constituting the subject is set as a target to be captured, and the determination unit determines whether or not the subject has entered the predetermined image capturing area, on the basis of the location information of the subject and the map information.

The image capturing system according to a fifteenth aspect of the present invention, wherein, when the determination unit determines that the subject set as the target to be captured has entered the image capturing area,
   the signal generation unit generates a control signal that instructs start of image capturing, and
   the image capturing control unit controls the image capturing unit on the basis of the control signal to start capturing images of the subject.

The image capturing system according to a sixteenth aspect of the present invention, wherein, when the determination unit determines that the subject has entered the image capturing area or the predetermined preparation area set before the image capturing area,
   the signal generation unit generates an area notification signal that notifies the subject that the subject has entered the image capturing area or the preparation area, and
   the communication control unit transmits the area notification signal to the subject.

The image capturing system according to a seventeenth aspect of the present invention, wherein
   the control device further includes:
   an image processing unit configured to perform image processing of extracting a face of the subject from image data captured by the image capturing unit; and
   an image determination unit configured to determine whether or not an image of the face of the subject has been captured on the basis of a result of the image processing,
   when an image of the face of the subject has not been captured, the signal generation unit generates a parameter control signal that controls an image capturing parameter of the image capturing unit such that an image of the face of the subject can be captured, and
   the image capturing control unit of the unmanned aerial vehicle
   controls the image capturing unit on the basis of the parameter control signal to perform the image capturing.

The image capturing system according to an eighteenth aspect of the present invention, wherein,
   when an image of the face of the subject has not been captured in determination of the image determination unit,
   the signal generation unit generates an image capturing guide signal that guides the subject to redo the image capturing, and
   the communication control unit transmits the image capturing guide signal to the subject.

A control device according to a nineteenth aspect of the present invention is a control device capable of communicating with an unmanned aerial vehicle including an image capturing unit capable of capturing an image of a subject in a flight state, the control device including:
   a storage unit configured to register subject information in which the subject is set as a target to be captured:
   a determination unit configured to determine whether the subject is present in a predetermined image capturing area, on the basis of location information of the subject and map information;
   a signal generation unit configured to generate a control signal that controls the image capturing unit on the basis of determination of the determination unit; and
   a communication control unit configured to transmit the subject information and the control signal to the unmanned aerial vehicle.

A control method according to a twentieth aspect of the present invention is a control method in a control device capable of communicating with an unmanned aerial vehicle including an image capturing unit capable of capturing an image of a subject in a flight state, the method including:
   a storing step of registering, to a storage unit, subject information in which the subject is set as a target to be captured;
   a determining step in which a determination unit determines whether the subject is present in a predetermined image capturing area, on the basis of location information of the subject and map information;
   a signal generating step in which a signal generation unit generates a control signal that controls the image capturing unit on the basis of determination in the determining step; and
   a communication controlling step in which a communication control unit transmits the subject information and the control signal to the unmanned aerial vehicle.

A storage medium according to a twenty-first aspect of the present invention is a computer-readable storage medium storing a program causing a computer to execute each step of a control method in a control device capable of communicating with an unmanned aerial vehicle including an image capturing unit capable of capturing an image of a subject in a flight state, wherein
   the control method includes:
   a storing step of registering, to a storage unit, subject information in which the subject is set as a target to be captured;
   a determining step in which a determination unit determines whether the subject is present in a predetermined image capturing area, on the basis of location information of the subject and map information;
   a signal generating step in which a signal generation unit generates a control signal that controls the image capturing unit on the basis of determination in the determining step; and
   a communication controlling step in which a communication control unit transmits the subject information and the control signal to the unmanned aerial vehicle.

Advantageous Effects of Invention

According to the image capturing system of the first aspect of the present invention, a technology capable of capturing an image of a subject registered in advance using an unmanned aerial vehicle can be provided.

According to the image capturing system of the second aspect of the present invention, a technology capable of capturing an image of, using an unmanned aerial vehicle, a user traveling on a vehicle using users of a plurality of vehicles registered as a group in advance as a subject can be provided.

According to the image capturing system of the third aspect of the present invention, start timing of image capturing can be controlled, and an image of the vehicle that has entered the image capturing area first can be captured even when the image capturing area is small or the inter-vehicle distance between the vehicles in the group is large.

According to the image capturing system of the fourth aspect of the present invention, end timing of image capturing can be controlled, and images of a plurality of vehicles set as a group can be captured without omission.

According to the image capturing system of the fifth aspect of the present invention, start timing of image capturing can be controlled, an image can be captured when all the plurality of vehicles set as the group are in the image capturing area, and only the video that satisfies the needs of the users can be captured.

According to the image capturing system of the sixth aspect of the present invention, traveling in preparation for image capturing can be performed, such as aligning a platoon of vehicles in the group, by notifying the user of the area notification signal before image capturing.

According to the image capturing system of the seventh aspect of the present invention, by controlling the image capturing unit on the basis of the parameter control signal, images of the faces of all the members in the group can be captured.

According to the image capturing system of the eighth aspect of the present invention, even when images of the faces of all the users could not be captured, an image can be re-captured immediately in the image capturing area by generating the image capturing guide signal for guiding the user to redo image capturing and transmitting the image capturing guide signal to the plurality of vehicles.

According to the image capturing system of the ninth aspect of the present invention, when the inter-vehicle distance is too large, there is a possibility that images of the plurality of users cannot be simultaneously captured during traveling in the image capturing area. Accordingly, it is possible to prompt the user to reduce the inter-vehicle distance by transmitting, to a plurality of vehicles, the distance notification signal for notifying that the inter-vehicle distance exceeds a distance of the upper limit of the reference distance range to notify the users.

According to the image capturing system of the tenth aspect of the present invention, when the inter-vehicle distance is too small, there is a possibility that images of the plurality of users cannot be simultaneously captured due to overlap of the users during traveling in the image capturing area. Accordingly, it is possible to prompt the user to increase the inter-vehicle distance by transmitting, to the plurality of vehicles, the approach notification signal for notifying that the inter-vehicle distance is equal to or less than a distance of the lower limit of the reference distance range to notify the users.

According to the image capturing system of the eleventh aspect of the present invention, when the speed difference exceeds the reference speed, there is a possibility that the plurality of users cannot be simultaneously captured during traveling in the image capturing area. Accordingly, it is possible to prompt the user to reduce the speed difference by transmitting, to the plurality of vehicles, the speed notification signal for notifying that the speed difference exceeds the reference speed to notify the users.

According to the image capturing system of the twelfth aspect of the present invention, when it is determined that image capturing condition is backlight condition on the basis of the captured image data, an image can be captured while avoiding backlight by changing the flight position of the unmanned aerial vehicle.

According to the image capturing system of the thirteenth aspect of the present invention, when it is determined that image capturing condition is backlight condition on the basis of the captured image data, an image can be captured while avoiding backlight by changing the angle of view of the image capturing unit.

According to the image capturing system of the fourteenth aspect of the present invention, a technology capable of capturing an image of a pedestrian or a user of a single vehicle by an unmanned aerial vehicle, using the pedestrian or the user of the single vehicle registered in advance as a subject can be provided.

According to the image capturing system of a fifteenth aspect of the present invention, start timing of image capturing can be controlled. In this way, even when the image capturing area is small, an image of the subject can be captured without missing the timing of image capturing.

According to the image capturing system of the sixteenth aspect of the present invention, notifying the subject of the area notification signal before image capturing allows the subject to prepare for image capturing in advance.

According to the image capturing system of the seventeenth aspect of the present invention, by controlling the image capturing unit on the basis of the parameter control signal, an image of the face of the pedestrian or the user traveling using a single vehicle, both of which are subjects, can be captured.

According to the image capturing system of the eighteenth aspect of the present invention, even when an image of the face of the subject could not be captured, an image can be re-captured immediately in the image capturing area by generating the image capturing guide signal for guiding the subject to redo image capturing and transmitting the image capturing guide signal to the terminal of the subject.

According to the control device of the nineteenth aspect, the control method of the twentieth aspect, and the storage medium according to the twenty-first aspect of the present invention, a control technology for capturing an image of a subject registered in advance by using an unmanned aerial vehicle can be provided.

BRIEF DESCRIPTION OF HE DRAWINGS

DESCRIPTION OF THE EMBODIMENTS

Hereinafter, embodiments will be described in detail with reference to the accompanying drawings. Note that the following embodiments do not limit the invention according to the claims, and not all combinations of features described in the embodiments are essential to the invention.

First Embodiment (Configuration of Image Capturing System)

Figure 1:
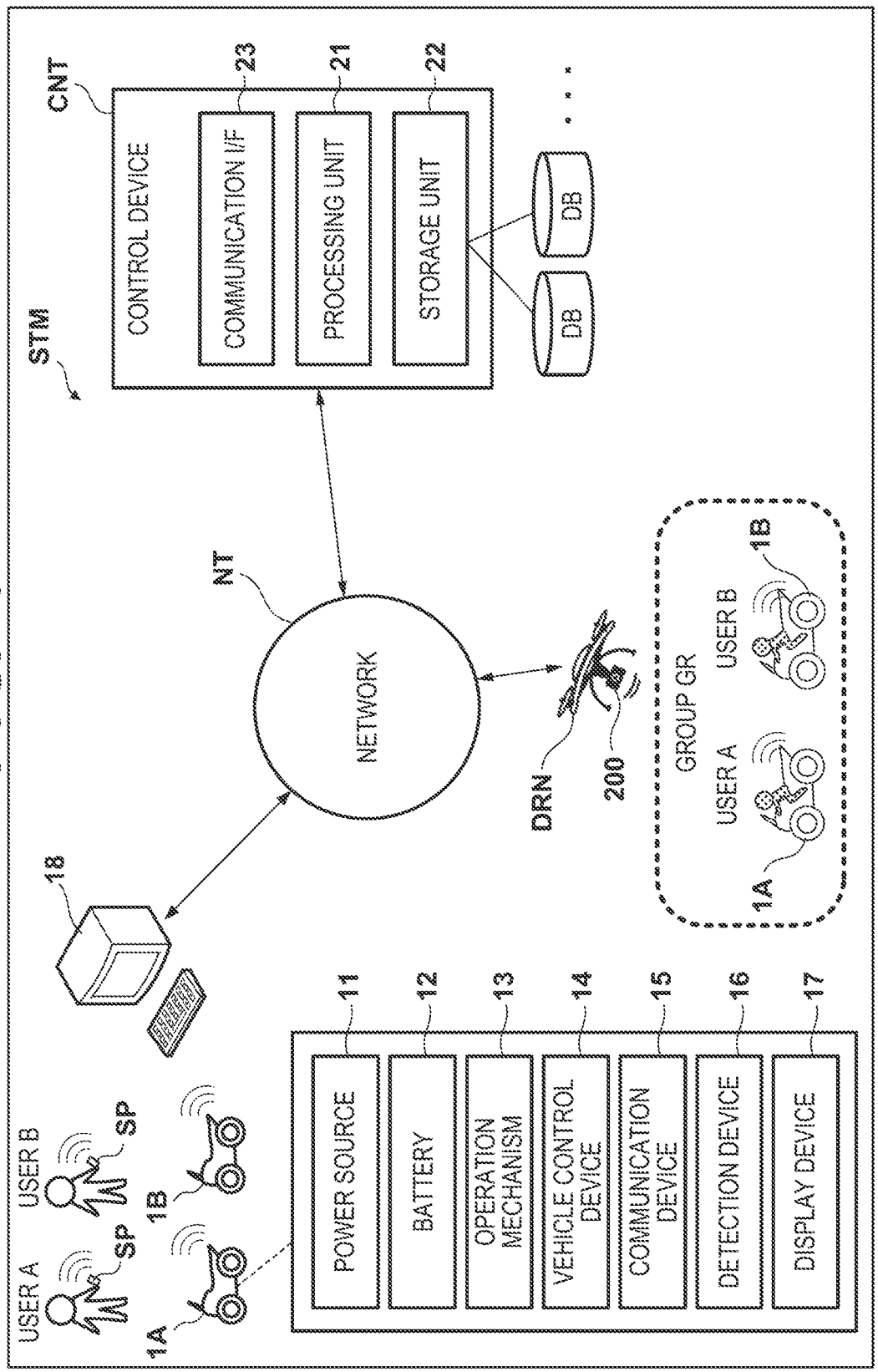
FIG. 1 is a block diagram describing an example of an image capturing system according to a first embodiment.

FIG. 1 is a diagram illustrating an example of the configuration of an image capturing system STM according to a first embodiment. The image capturing system STM includes an unmanned aerial vehicle DRN and a control device CNT (control server) capable of communicating with a terminal of a subject and the unmanned aerial vehicle DRN. The unmanned aerial vehicle DRN includes an image capturing unit 200 (camera) capable of capturing images of a plurality of vehicles in a flight state. The subject includes, for example, a pedestrian, a user of a single vehicle, or users of a plurality of vehicles. In the first embodiment, an example in which users of a plurality of vehicles constituting the subject is described as a group of targets to be captured will be described.

The control device CNT can remotely communicate with a plurality of vehicles 1A and 1B and the unmanned aerial vehicle DRN via a network NT, and can output a signal for controlling the unmanned aerial vehicle DRN via the network NT.

An information processing apparatus 18 is an external terminal that manages vehicle renting (vehicle use service). When a vehicle is rented to a user, user information (e.g., including terminal information of the user) for identifying the user and vehicle information for identifying the rented vehicle are transmitted to the control device CNT via the network NT. The information processing apparatus 18 (external terminal) can be installed, for example, in an external base (agency) such as a hotel, a rental-car vendor, or a dealer that provides sales or maintenance service of vehicles.

The external base (agency) can provide service of capturing an image of, by using the unmanned aerial vehicle DRN, users A and B traveling in the vehicles 1A and 1B using the plurality of users A and B who receive vehicle rental as a group GR.

When acquiring information (user information (including terminal information of the user) and vehicle information) transmitted from the information processing apparatus 18 (external terminal) via a communication interface unit 23 (communication I/F), the control device CNT registers, in a database DB of a storage unit 22, subject information in which a subject is set as a target to be captured. When the users of the plurality of vehicles constituting the subject are set as the group of targets to be captured, the control device CNT registers, in the database DB of the storage unit 22, group information in which the users A and B of the plurality of vehicles 1A and 1B are set as one group GR. Then, when a plurality of vehicles set as the group are traveling in a predetermined image capturing area, a processing unit 21 of the control device CNT generates a control signal for controlling the image capturing unit 200 of the unmanned aerial vehicle DRN, and transmits the control signal to the unmanned aerial vehicle DRN via the network NT.

The image capturing unit 200 of the unmanned aerial vehicle DRN can capture an image on the basis of a control signal transmitted from the control device CNT. The image captured by the image capturing unit 200 is transmitted to the control device CNT via the network NT and stored in the database DB of the storage unit 22. The captured image can be confirmed (viewed) by using preview display on the information processing apparatus 18 (external terminal) or terminals of the plurality of users A and B, for example, mobile terminals SP (e.g., smartphones) at the time of returning the rented vehicle. If the user A or B likes the captured image the image data can be purchased. When the image data is purchased, the image data may be downloaded to the respective mobile terminals SP (smartphones) of the plurality of users A and B, or the image data can be stored in a storage medium such as a compact disc-read only memory (CD-ROM) or a digital versatile disc (DVD) to provide to the user. Specific functional configurations of the processing unit 21 of the control device CNT and the unmanned aerial vehicle DRN will be described in detail later.

In the embodiment, as an example of the plurality of vehicles, an electric motorcycle such as a straddle type vehicle can be used for the vehicles 1A and 1B, for example. Note that the straddle type vehicle refers to a type of vehicle in which a driver rides on a vehicle body, and the concept thereof includes a scooter type motorcycle and the like.

The vehicle A and the vehicle B have similar configurations, and the configuration of the vehicle 1A will be described as a representative in the following description. Although FIG. 1 illustrates an example of two vehicles 1A and 1B as an example of a plurality of vehicles, the present invention is not limited to this example, and three or more vehicles can form a group.

The vehicle 1A includes a power source 11, a battery 12 (power supply device) that supplies electric power to the vehicle, an operation mechanism 13, a vehicle control device 14 that controls the vehicle, and a communication device 15. In the embodiment, the power source 11 is an electric motor, and the battery 12 can supply electric power to the power source 11 and each element constituting the vehicle 1. A rechargeable secondary battery is used as the battery 12, for example. Examples thereof include a lead storage battery, a lithium-ion battery, and a nickel-hydrogen battery. The battery 12 can be charged by being coupled to a power supply capable of supplying a predetermined voltage via a cable. Alternatively, the battery 12 may be replaced with a charged battery at a battery-exchange station provided in the middle of the travel route, and the charged battery 12 may be mounted on the vehicle.

The operation mechanism 13 is configured to be able to input operation for controlling the power source 11, and outputs a predetermined signal to the vehicle control device 14 described later on the basis of, for example, an operation input by a user. Examples of the operation input to the operation mechanism 13 include rotational operation using a predetermined key corresponding to the vehicle (ignition key, remote key, or the like), pressing operation using a pressing type switch (a start switch or the like).

The vehicle control device 14 is an electronic control unit (ECU) capable of controlling the operation of the entire vehicle 1A, and can transmit and receive signals to and from each component of the vehicle 1A via a predetermined signal line, for example. As an example, the vehicle control device 14 can receive a signal in accordance with an operation input to the operation mechanism 13 and control such that the power source 11 is started.

The function of the vehicle control device 14 can be implemented by any of software or hardware. For example, the function of the vehicle control device 14 may be implemented by a central processing unit (CPU) executing a predetermined program using a memory. Alternatively, the function of the vehicle control device 14 may be implemented by a publicly known semiconductor device such as a programmable logic device (PLD) or an application specific integrated circuit (ASIC). In addition, here, the vehicle control device 14 is described as a single element, but the vehicle control device 14 may be divided into two or more elements as necessary.

The communication device 15 includes an antenna for implementing communication with the control device CNT via the network NT. Furthermore, the communication device 15 includes a telematics control unit (TCU) or the like that performs signal processing for implementing communication with the control device CNT via the network NT.

The TCU can acquire voltage information indicating a voltage value of the battery 12 from the battery 12, and the TCU can acquire control information indicating a control state of the vehicle 1 from the vehicle control device 14 (ECU). The TCU transmits, to the control device CNT via the network NT, the acquired voltage information of the battery 12 and control information of the vehicle control device 14 (ECU). In addition, the TCU can intervene in vehicle control in the vehicle control device 14 on the basis of information received from the control device CNT.

The communication device 15 can perform inter-vehicle communication between a plurality of vehicles constituting the group GR, and the communication device 15 of the vehicle 1A can perform wireless communication with the other vehicle 1B constituting the group GR and exchange information between the vehicles. The vehicle control device 14 can perform control such that, within the group GR, the speed and the vehicle distance during traveling in the image capturing area are adjusted by inter-vehicle communication between the vehicles.

A detection device 16 includes various sensors that detect various states of the vehicle 1A, and examples thereof includes a gyro sensor, a global positioning system (GPS) sensor, and a vehicle speed sensor that detects vehicle speed information. The vehicle control device 14 can control the vehicle 1A on the basis of the information detected by the detection device 16, and the communication device 15 can transmit the detection result of the detection device 16 to the control device CNT via the network NT.

The gyro sensor detects a rotational motion of the vehicle 1A. The vehicle control device 14 can determine the course of the vehicle 1A by the detection result of the gyro sensor, the vehicle speed sensor, and the like. The GPS sensor detects the current location of the vehicle 1A. In addition, the communication device 15 can communicate wirelessly with a server device that provides map information and traffic information, and acquire information of the current location of the vehicle 1A.

In the embodiment, the communication device 15 and the detection device 16 function as an acquisition unit that acquires location information of the vehicle, and the communication device 15 functions as a vehicle communication unit that transmits the location information of the vehicle via the network NT.

A display device 17 is configured to be able to display the remaining battery level of the battery 12 and the notification information received from the control device CNT, together with the speedometer and the tachometer. When the notification information regarding the vehicle speed and the inter-vehicle distance between the vehicles in the group GR is received from the control device CNT during traveling in the image capturing area, the display device 17 can display the notification information to the user to prompt the user to adjust the vehicle speed and the inter-vehicle distance. This makes it possible to travel in the image capturing area in a state where the vehicle speed and the inter-vehicle distance are adjusted in the group GR as preparation for image capturing when capturing an image.

The control device CNT includes the processing unit 21, the storage unit 22, and the communication interface unit 23 (communication I/F), and is installed, for example, in a management company that provides vehicle use service. The processing unit 21 includes a processor including a CPU and a memory, and the storage unit 22 includes a random-access memory (RAM) serving as a processing area of a program, a ROM that stores various programs and data, and a hard disk drive (HDD) having relatively large capacity. Further, they may be distributed on a cloud.

For example, the processing unit 21 can communicate with the vehicles 1A and 1B and the unmanned aerial vehicle DRN via the network NT by the communication interface unit 23, store information on the vehicles 1A and 1B and the unmanned aerial vehicle DRN in the storage unit 22, or read information on the vehicles 1A and 1B and the unmanned aerial vehicle DRN from the storage unit 22. In addition, image data captured by the image capturing unit 200 of the unmanned aerial vehicle DRN can be stored in the storage unit 22.

When a vehicle is rented to a user, user information for identifying the user and vehicle information for identifying the rented vehicle are transmitted to the control device CNT via the network NT. The storage unit 22 registers subject information in which a subject is set as a target to be captured. Here, the subject information includes terminal information of the user and vehicle information of the vehicle used by the user. When users of a plurality of vehicles are subjects, the storage unit 22 can register group information in which the users of the plurality of vehicles are set as one group GR. In the example of FIG. 1, the group OR includes the user A who uses the vehicle 1A and the user B who uses the vehicle 1B. Although the group GR is one group in the example of FIG. 1, the storage unit 22 can register group information related to a plurality of groups.

(Functional Configuration of Unmanned Aerial Vehicle DRN)

Figure 2:
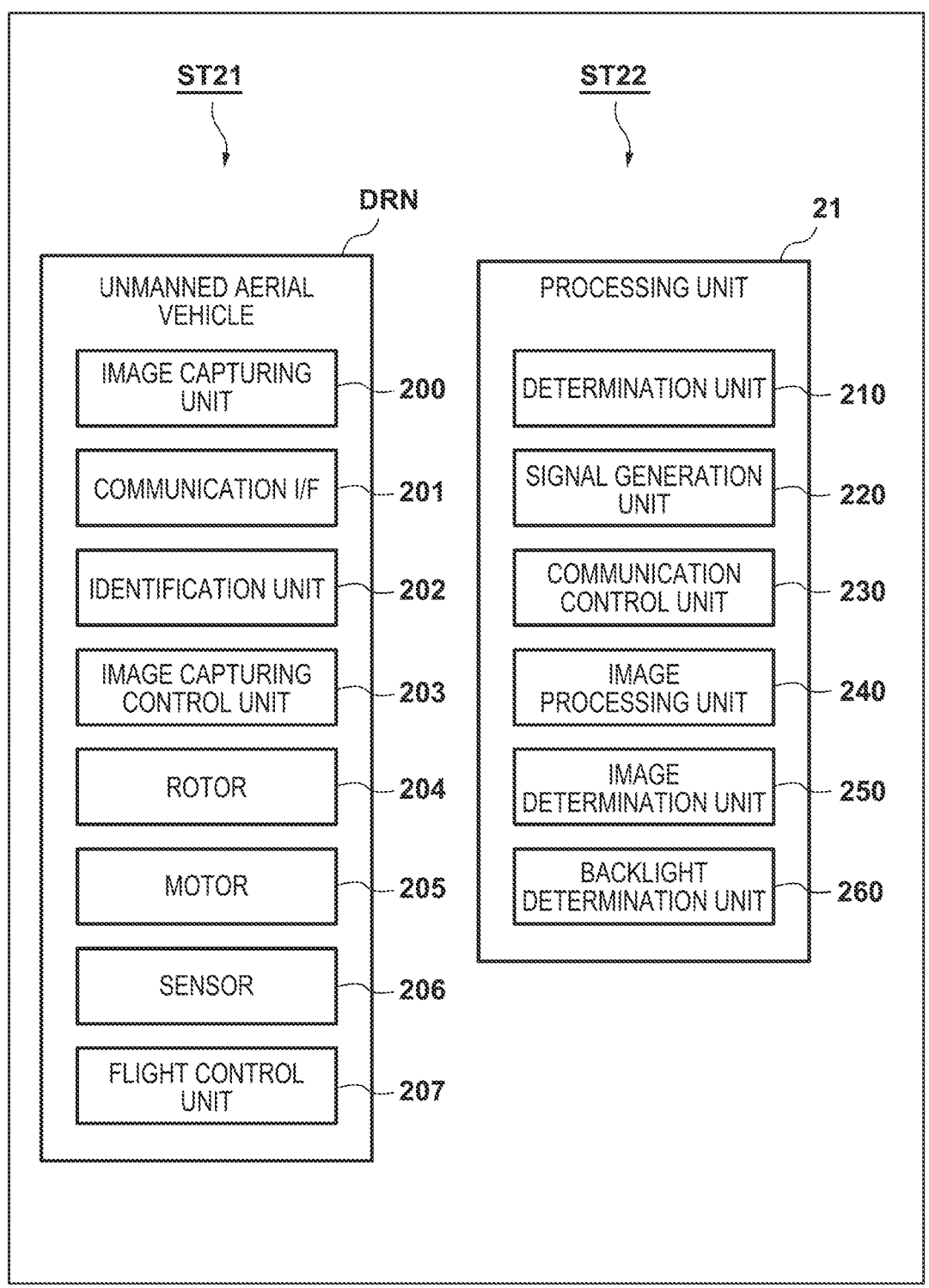
FIG. 2 illustrates ST21 that is a block diagram illustrating a functional configuration of an unmanned aerial vehicle, and ST22 that is a block diagram illustrating a functional configuration of a processing unit.

Next, a functional configuration of the unmanned aerial vehicle DRN will be described. ST21 in FIG. 2 is a block diagram illustrating a functional configuration of the unmanned aerial vehicle DRN. The image capturing unit 200 is a camera mounted on the unmanned aerial vehicle DRN, and the image capturing unit 200 is configured to be able to capture an image of a plurality of vehicles by the unmanned aerial vehicle DIN in a flight state. The image capturing unit 200 of the unmanned aerial vehicle DRN can capture a still image or a moving image.

A communication interface unit 201 (communication I/F) can communicate with the vehicles 1A and 1B and the control device CNT via the network NT. The communication interface unit 201 transmits the image data captured by the image capturing unit 200 to the control device CNT.

An identification unit 202 identifies the subject on the basis of the subject information distributed from the terminal of the subject (mobile terminal SP) and the subject information transmitted from the control device CNT (communication control unit 230). Note that the information used to identify the subject is not limited to the subject information distributed from the terminal of the subject, and it is also possible to identify the plurality of vehicles constituting the group GR on the basis of the vehicle information distributed from the plurality of vehicles 1A and 1B and the vehicle information included in the subject information (group information) transmitted from the control device CNT.

When the unmanned aerial vehicle DRN captures an image, group information including vehicle information for identifying the vehicle is transmitted from the communication interface unit 23 of the control device CNT to the unmanned aerial vehicle DRN as information for identifying the group GR. In addition, the plurality of vehicles 1A and 1B distribute vehicle information for identifying the vehicles from the communication device 15 during traveling, and the identification unit 202 can identify the plurality of vehicles constituting the group GR on the basis of the group information transmitted from the communication interface unit 23 of the control device CNT by checking the vehicle information.

An image capturing control unit 203 controls the image capturing unit 200 on the basis of the control signal to control image capturing of the plurality of vehicles identified by the identification unit 202. When receiving the control signal (parameter control signal) transmitted from the control device CNT, the image capturing control unit 203 can perform, on the basis of the control signal, control to move the angle of view of the image capturing unit 200 in the horizontal direction (pan control), control to move the angle of view of the image capturing unit 200 in the vertical direction (tilt control), and control to enlarge (zoom up) or reduce (zoom out) the angle of view and capture an image.

A rotor 204 rotates using a motor 205 as a drive source, and generates propulsive force of the unmanned aerial object DRN. In order to control the attitude in the flight state, the unmanned aerial vehicle DRN is provided with at least four rotors 204 and motors 205, and a flight control unit 207 can control the output of each motor 205. The flight control unit 207 can turn to change the flight position or change the flight altitude on the basis of the control signal transmitted from the control device CNT.

A sensor 206 is, for example, a distance sensor, and detects a distance between the plurality of vehicles identified by the identification unit 202 and the unmanned aerial vehicle DRN.

(Functional Configuration of Processing Unit 21)

Figure 3:
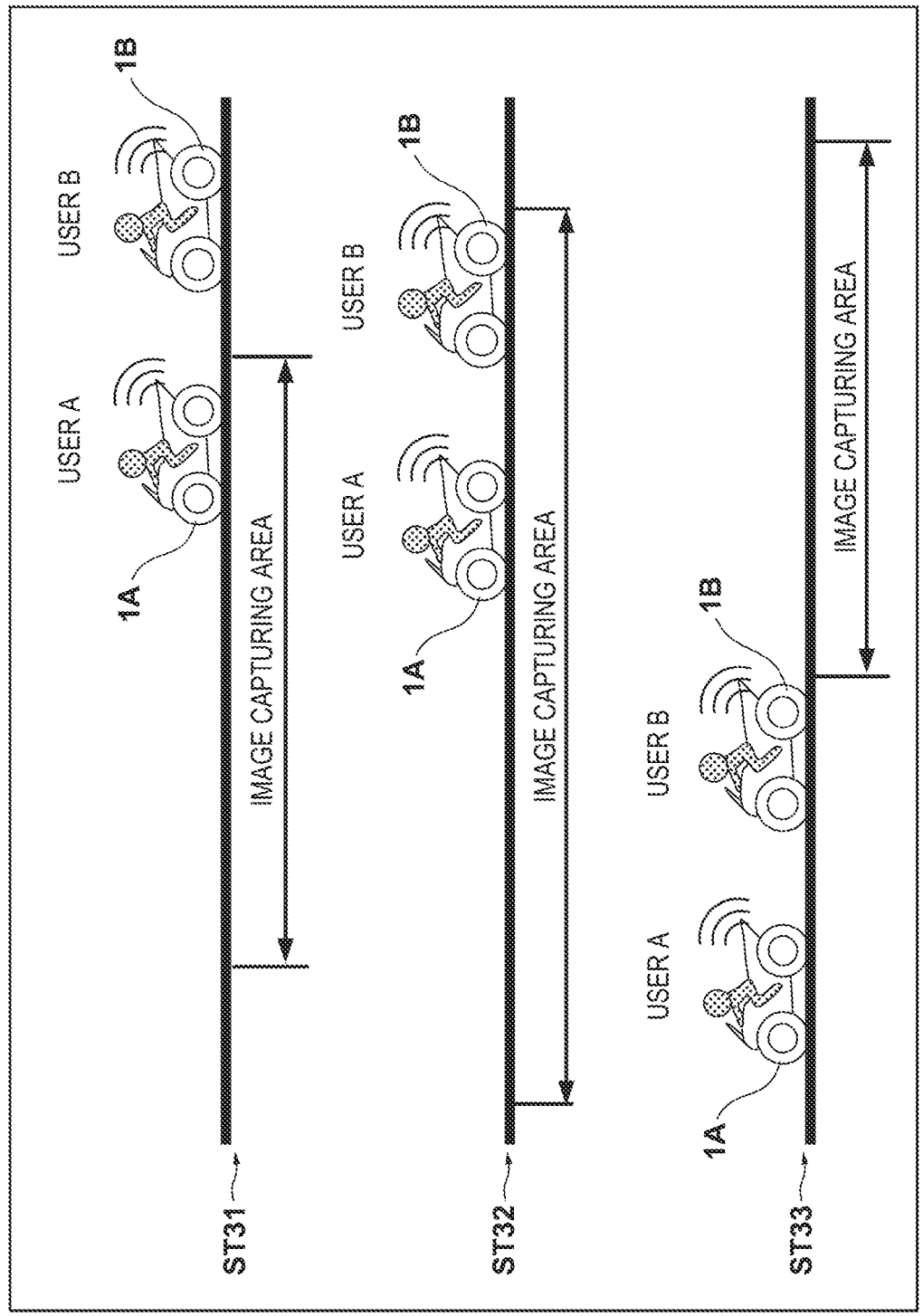
FIG. 3 is a diagram schematically illustrating processing of a determination unit.

Next, a specific functional configuration of the processing unit 21 of the control device CNT will be described. S122 in FIG. 2 is a block diagram illustrating a functional configuration of the processing unit 21. FIG. 3 is a diagram schematically illustrating processing of a determination unit 210.

The determination unit 210 can perform various types of determination processing, and determines whether the subject is present in the predetermined image capturing area on the basis of the location information of the subject acquired by communication with the terminal of the subject and the map information. For example, when users of a plurality of vehicles are subjects, the determination unit 210 determines whether the plurality of vehicles 1A and 1B are traveling in the predetermined image capturing area on the basis of the map information and the location information of the plurality of vehicles 1A and 1B set as the group GR. The determination unit 210 can access the database of the map information constructed in the storage unit 22, and the determination unit 210 compares the location information of the plurality of vehicles with the map information to determine whether or not the vehicle is traveling in the set image capturing area.

For example, as illustrated in ST31 of FIG. 3, in a case where the determination unit 210 determines that at least one (vehicle 1A) of the plurality of vehicles 1A and 1B set as the group GR has entered the image capturing area, for example, when the image capturing area is smaller (has a smaller distance) than the reference area, or when the inter-vehicle distance between the vehicles 1A and 1B in the group GR is large, the determination unit 210 determines that the plurality of vehicles 1A and 1B are traveling in the image capturing area.

Further, as illustrated in ST32 of FIG. 3, in a case where all of the plurality of vehicles 1A and 1B set as the group GR enter the image capturing area, for example, when the image capturing area is larger (has a greater distance) than the reference area, the determination unit 210 determines that the plurality of vehicles is traveling in the image capturing area.

A signal generation unit 220 can generate various signals on the basis of the determination of the determination unit 210, and for example, generates a control signal for controlling the image capturing unit 200 of the unmanned aerial vehicle DRN on the basis of the determination of the determination unit 210.

When the determination unit 210 determines that the plurality of vehicles is traveling in the image capturing area in a state where image capturing is not started, the signal generation unit 220 generates a control signal for instructing the start of image capturing.

In addition, when the determination unit 210 determines that at least one of the plurality of vehicles is traveling in the image capturing area after image capturing is started, the signal generation unit 220 generates a control signal for instructing continuation of image capturing.

Then, as illustrated in ST33 of FIG. 3 when the determination unit 210 determines that all of the plurality of vehicles 1A and 1B have left the image capturing area, the signal generation unit 220 generates a control signal for instructing end of image capturing.

The communication control unit 230 can transmit the signal generated by the signal generation unit 220 via the communication interface unit 23, and for example, transmits the control signal generated by the signal generation unit 220 to the unmanned aerial vehicle DRN via the communication interface unit 23.

When image capturing is started, the communication control unit 230 transmits subject information and the control signal to the unmanned aerial vehicle DRN. When users of a plurality of vehicles are subjects, the storage unit 22 registers, as part of the subject information, group information in which users of the plurality of vehicles constituting the subjects are set as a group of targets to be captured. In this case, the communication control unit 230 transmits subject information (including group information) and the control signal to the unmanned aerial vehicle DRN. In this way, the identification unit 202 of the unmanned aerial vehicle DRN can identify the plurality of vehicles constituting the group GR on the basis of the group information, and images of the plurality of identified vehicles can be captured by the image capturing unit 200.

Note that, when the determination unit 210 determines that at least one of the plurality of vehicles has entered the image capturing area or the predetermined preparation area set before the image capturing area, the signal generation unit 220 can generate an area notification signal for notifying the user that the vehicle has entered the image capturing area or the preparation area, and the communication control unit 230 can transmit the area notification signal to the plurality of vehicles.

Traveling in preparation for image capturing can be performed, such as aligning a platoon of vehicles in the group GR, by notifying the user of the area notification signal before image capturing.

When continuing image capturing or ending image capturing, the communication control unit 230 transmits, to the unmanned aerial vehicle DRN, a control signal for instructing continuation of image capturing or a control signal for instructing end of image capturing, both of which have been generated by the signal generation unit 220.

The image capturing control unit 203 of the unmanned aerial vehicle DRN controls the image capturing unit 200 on the basis of a control signal for instructing continuation of image capturing to continue image capturing. In addition, the image capturing control unit 203 of the unmanned aerial vehicle DRN controls the image capturing unit 200 on the basis of a control signal for instructing end of image capturing to end image capturing.

An image processing unit 240 can perform image processing of extracting a face of a user from image data captured by the image capturing unit 200 of the unmanned aerial vehicle DRN. When the image data is a moving image, the image processing unit 240 performs image processing on an image of each frame. Furthermore, the image processing unit 240 can also perform image processing on an image sampled at a predetermined frame rate.

On the basis of the result of the image processing and the group information, an image determination unit 250 determines whether or not images of the faces of the users have been captured equivalent to the number of persons set as the group GR. For example, when the faces of the two users A and B set as the group GR are extracted by the image processing, that is, when the set number (N1) of the group GR is equal to the number of extraction (N2) extracted by the image processing (N1=N2), the image determination unit 250 determines that images of the faces of all the users constituting the group GR have been captured.

On the other hand, when the number of faces of the user extracted in the result of the image processing is one, that is, when the set number (N1=2) of the groups GR is not equal to the number of extraction (N2=1) extracted by the image processing (in this case, N1>N2), the image determination unit 250 determines that images of the faces of the users has not been captured equivalent to the number of persons set as the group GR.

A backlight determination unit 260 determines whether or not it is in a backlight condition on the basis of the image data captured by the image capturing unit 200. For example, when the image data captured by the image capturing unit 200 includes a region where the pixel value locally exceeds the reference pixel value, the backlight determination unit 260 can determine that such an image has been captured in the backlight image capturing condition. In this case, the signal generation unit 220 generates a flight control signal for instructing a change in the flight position of the unmanned aerial vehicle DRN so as to avoid backlight, or generates a control signal for changing the angle of view of the image capturing unit 200. A specific processing will be described in the additional processing regarding the backlight determination after step S570 in FIG. 5.

(Processing Flow)

Figure 4:
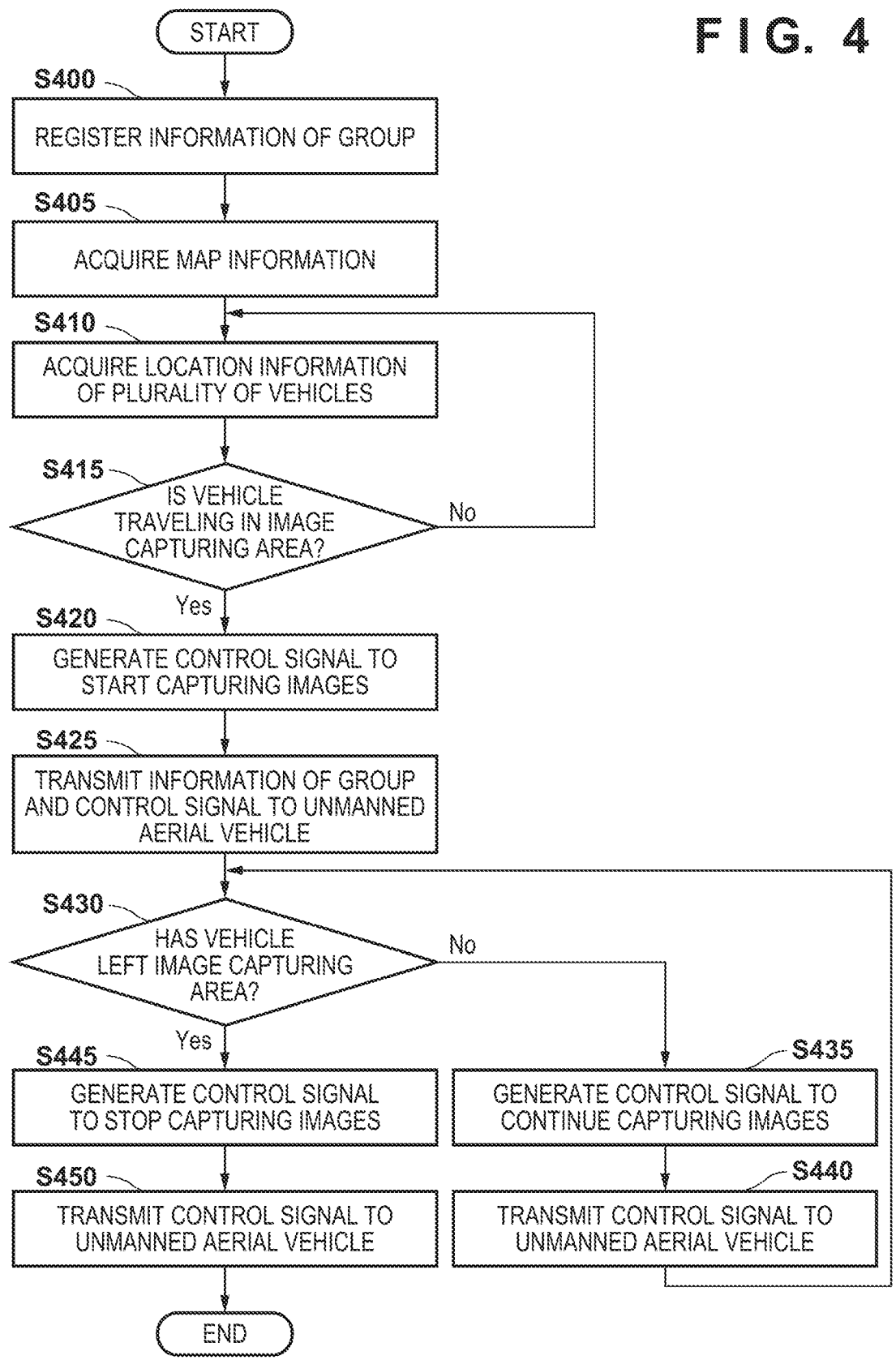
FIG. 4 is a diagram describing a flow of processing of a storage unit and the processing unit.

FIG. 4 is a diagram for explaining the flow of processing of the storage unit 22 and the processing unit 21 (determination unit 210, signal generation unit 220, and communication control unit 230).

In step S400, the storage unit 22 registers information of the group GR. When the control device CNT acquires information (user information and vehicle information) transmitted from the information processing apparatus 18 (external terminal) via the communication interface unit 23, the storage unit 22 registers, in the database DB, group information in which the users A and B of the plurality of vehicles 1A and 1B are set as one group GR.

In step S405, the determination unit 210 acquires map information from the database of map information constructed in the storage unit 22.

In step S410, the determination unit 210 acquires the location information of the plurality of vehicles. In step S415, the determination unit 210 determines whether the plurality of vehicles 1A and 1B are traveling in a predetermined image capturing area on the basis of the location information of the plurality of vehicles 1A and 1B set as the group GR and the map information.

When the vehicles are not traveling in the image capturing area in the determination in step S415 (NO in S415), the determination unit 210 returns the processing to step S410 and repeats the same processing.

On the other hand, when the vehicle is traveling in the image capturing area in the determination in step S415 (YES in S415), the process proceeds to step S420.

In step S420, the signal generation unit 220 generates a control signal for instructing start of image capturing, as a control signal for controlling the image capturing unit 200 of the unmanned aerial vehicle DRN on the basis of the determination of the determination unit 210.

Then, in step S425, the communication control unit 230 transmits the information of the registered group GR and the generated control signal to the unmanned aerial vehicle DRN.

The identification unit 202 of the unmanned aerial vehicle DRN identifies the plurality of vehicles constituting the group GR on the basis of the group information, and images of the plurality of identified vehicles are captured by the image capturing unit 200.

In step S430, the determination unit 210 determines whether all of the plurality of vehicles 1A and 1B have left the image capturing area. When all of the vehicles have not left the image capturing area (NO in S430), that is, when the determination unit 210 determines that at least one of the plurality of vehicles is traveling in the image capturing area, the processing proceeds to step S435.

In step S435, the signal generation unit 220 generates a control signal for instructing continuation of image capturing. In step S440, the communication control unit 230 transmits, to the unmanned aerial vehicle DRN, a control signal for instructing continuation of image capturing, which has been generated by the signal generation unit 220. When receiving the control signal for instructing the continuation of image capturing, the image capturing control unit 203 of the unmanned aerial vehicle DRN controls the image capturing unit 200 on the basis of a control signal for instructing continuation of image capturing to continue image capturing.

On the other hand, when the determination unit 210 determines that all of the plurality of vehicles 1A and 1B have left the image capturing area in the determination of step S430 (YES in S430), the signal generation unit 220 generates, in step S445, a control signal for instructing end of image capturing.

Then, in step S450, the communication control unit 230 transmits, to the unmanned aerial vehicle DRN, the control signal for instructing end of image capturing, which has been generated by the signal generation unit 220. When receiving the control signal for instructing the end of image capturing, the image capturing control unit 203 of the unmanned aerial vehicle DRN controls the image capturing unit 200 on the basis of a control signal for instructing end of image capturing to end image capturing.

(Processing Flow of Image Processing Unit and Image Determination Unit)

Figure 5:
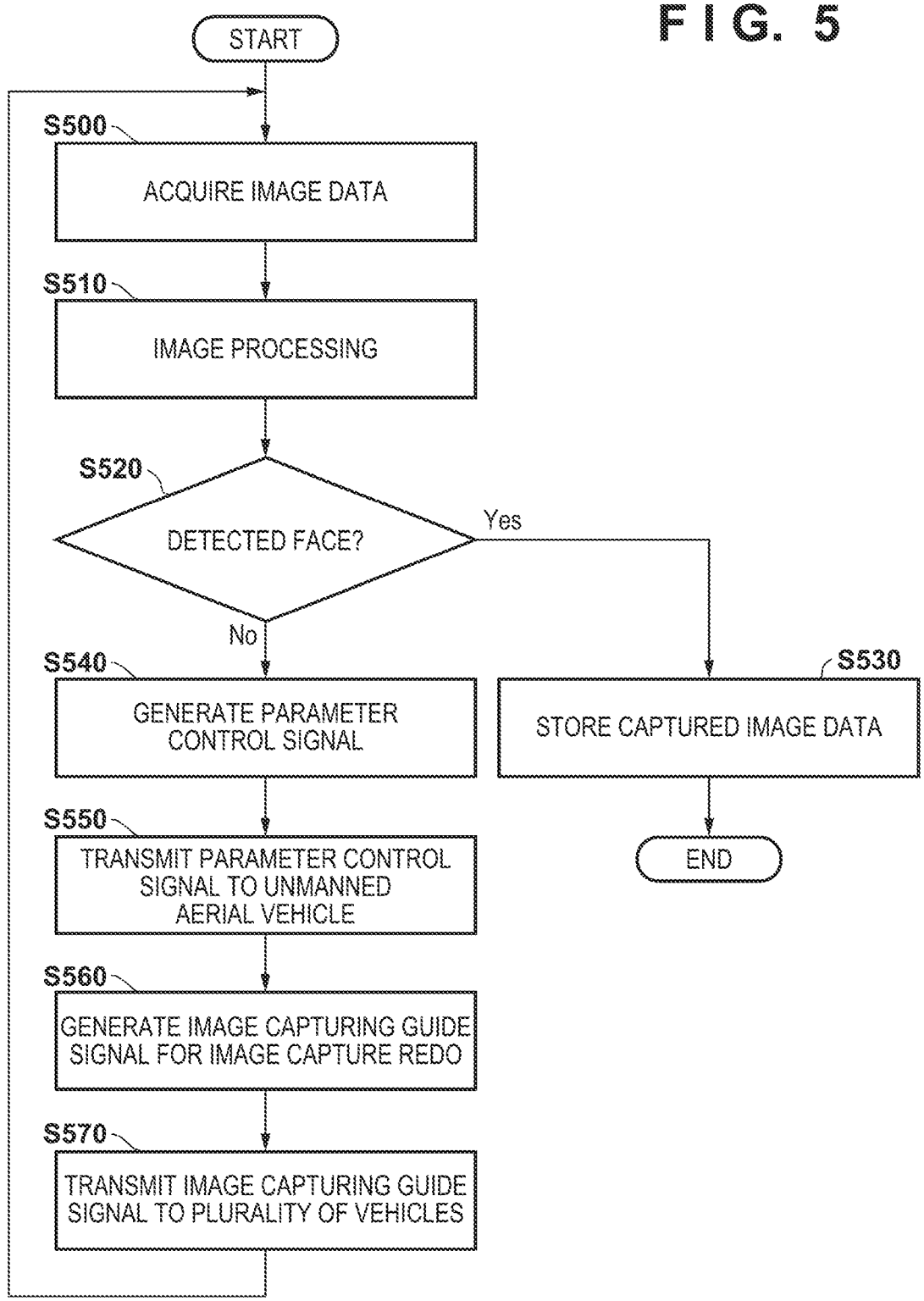
FIG. 5 is a diagram describing a flow of processing of an image processing unit and an image determination unit.

FIG. 5 is a diagram describing a flow of processing of the image processing unit 240 and the image determination unit 250. In step S500, the image processing unit 240 acquires image data captured by the image capturing unit 200 of the unmanned aerial vehicle DRN.

In step S510, the image processing unit 240 performs image processing of extracting the face of the user from the image data.

In step S520, on the basis of the result of the image processing acquired in step S510 and the group information registered in advance, the image determination unit 250 performs image determination on whether or not images of the faces of the users have been captured equivalent to the number of persons set as the group GR.

When images of the faces of the users have been captured equivalent to the number of persons set as the group in the determination in step S520 (YES in S520), the process proceeds to step S530.

Then, in step S530, the storage unit 22 stores the captured image data in the database, and ends the processing.

The image data stored in the database can be provided to the preview display on the information processing apparatus 18 (external terminal) or the mobile terminals SP of the plurality of users A and B when the rented vehicle is returned. When the user A or B likes the captured image, such a user can purchase the image data. In this case, such a user can download the image data to the respective mobile terminals SP (smartphones) of the plurality of users A and B. It is also possible to store image data in a storage medium and provide the image data to the user.

On the other hand, when images of the faces of the users have not been captured equivalent to the number of persons set as the group in the determination in step S520 (NO in S520), the process proceeds to step S540.

In step S540, the signal generation unit 220 generates a parameter control signal for controlling the image capturing parameter. When images of the faces of the users have not been captured equivalent to the number of persons set as the group, the signal generation unit 220 generates a parameter control signal for controlling the image capturing parameters of the image capturing unit 200 such that images of the faces of the users (all the users) can be captured equivalent to the number of persons set as the group. The signal generation unit 220 can generate a parameter control signal for moving the angle of view of the image capturing unit 200 in the horizontal direction as the image capturing parameter for the pan control, or generate a parameter control signal for moving the angle of view of the image capturing unit 200 in the vertical direction as the image capturing parameter for the tilt control. Furthermore, a parameter control signal for capturing an image by enlarging (zooming up) or reducing (zooming out) the angle of view can be generated.

In step S550, the communication control unit 230 transmits the parameter control signal generated by the signal generation unit 220 to the unmanned aerial vehicle DRN. When receiving the parameter control signal, the image capturing control unit 203 of the unmanned aerial vehicle DRN controls the image capturing unit 200 on the basis of the parameter control signal to capture an image while moving using the unmanned aerial vehicle DRN. Images of the faces of all members in the group can be captured by controlling the angle of view of the image capturing unit 200 on the basis of the parameter control signal.

In step S560, the signal generation unit 220 generates an image capturing guide signal for the redoing of image capturing. When images of the faces of the users A and B have not been captured equivalent to the set number of persons in the determination of the image determination unit 250, the signal generation unit 220 generates an image capturing guide signal for guiding the users A and B to redo image capturing.

Then, in step S570, the communication control unit 230 transmits the image capturing guide signal to the plurality of vehicles 1A and 1B. When receiving the image capturing guide signal the display device 17 of each vehicle presents a display based on the image capturing guide signal to the user, and guides the user to capture an image again. In this way, even when images of the faces of all the users could not be captured, an image can be re-captured immediately in the image capturing area by generating the image capturing guide signal and transmitting the image capturing guide signal to the plurality of vehicles.

After step S570, the processing returns to step S500, and thereafter, similar processing is repeatedly executed.

(Additional Processing Regarding Backlight Determination)

Note that, after step S570, additional processing regarding backlight determination can be performed. The backlight determination unit 260 determines whether or not the image capturing condition is backlight condition on the basis of the image data captured by the image capturing unit 200. For example, when the image data captured by the image capturing unit 200 includes a region where the pixel value locally exceeds the reference pixel value, the backlight determination unit 260 determines that such an image has been captured in the backlight condition.

When the image capturing condition is determined to be backlight condition, the signal generation unit 220 generates a flight control signal for instructing a change in the flight position of the unmanned aerial vehicle DRN so as to avoid backlight. For example, the signal generation unit 220 generates a flight control signal for instructing the unmanned aerial vehicle DRN to turn such that the sun does not come within the range of the viewing angle of the image capturing unit.

The communication control unit 230 transmits a flight control signal to the unmanned aerial vehicle DRN. When receiving the flight control signal, the flight control unit 207 of the unmanned aerial vehicle changes the flight position on the basis of the flight control signal.

Furthermore, when the image capturing condition is determined to be backlight condition, the signal generation unit 220 can also generate a control signal (parameter control signal) for performing control to move the angle of view of the image capturing unit 200 in the horizontal direction (pan control), or control to move the angle of view of the image capturing unit 200 in the vertical direction (tilt control).

The communication control unit 230 transmits a parameter control signal to the unmanned aerial vehicle DRN. When receiving the parameter control signal, the image capturing control unit 203 of the unmanned aerial vehicle DRN changes the angle of view of the image capturing unit 200 on the basis of the parameter control signal.

When the image capturing condition is determined to be backlight condition on the basis of the captured image data, an image can be captured while avoiding backlight by changing the flight position of the unmanned aerial vehicle or changing the angle of view of the image capturing unit 200.

(Processing of Adjusting Inter-vehicle Distance between Plurality of Vehicles)

The control device CNT checks the inter-vehicle distance at the time when the plurality of vehicles 1A and 1B travel in the image capturing area or the predetermined preparation area set before the image capturing area, and transmits the notification information to the plurality of vehicles so as to ensure the inter-vehicle distance suitable for image capturing (distance falling within a predetermined reference distance range).

For example, when the inter-vehicle distance between the vehicles exceeds a distance of the upper limit of the predetermined reference distance range, a distance notification signal for notifying that the inter-vehicle distance is too large is transmitted to the plurality of vehicles 1A and 1B to notify the user of each vehicle.

When the inter-vehicle distance between the vehicles is equal to or less than a distance of the lower limit of the predetermined reference distance range, an approach notification signal for notifying that the inter-vehicle distance is too small is transmitted to the plurality of vehicles 1A and 1B to notify the user of each vehicle.

Figure 6:
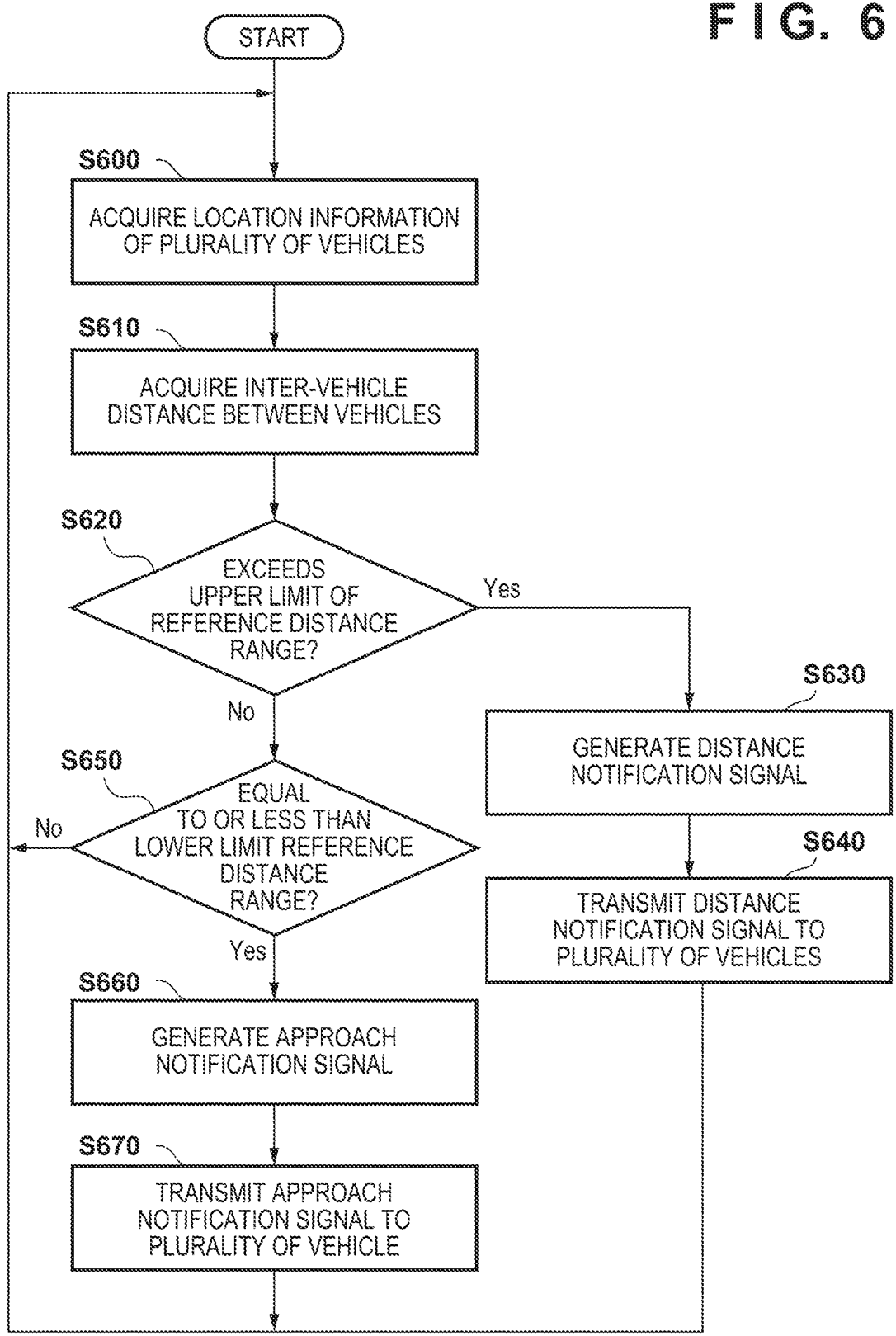
FIG. 6 is a diagram describing a flow of processing of adjusting an inter-vehicle distance between a plurality of vehicles.

FIG. 6 is a diagram describing a flow of processing of adjusting an inter-vehicle distance between a plurality of vehicles. In step S600, the determination unit 210 acquires location information of the plurality of vehicles 1A and 1B traveling in the image capturing area or the predetermined preparation area set before the image capturing area. In step S610, the determination unit 210 acquires the inter-vehicle distance of the plurality of vehicles 1A and 1B on the basis of the location information. For example, the determination unit 210 can acquire the inter-vehicle distance on the basis of the difference in the location information.

In step S620, when determining that the acquired inter-vehicle distance exceeds the distance of the upper limit of the predetermined reference distance range (YES in S620), the determination unit 210 advances the processing to step S630.

In step S630, the signal generation unit 220 generates a distance notification signal for notifying the user that the inter-vehicle distance exceeds the distance of the upper limit of the reference distance range. Then, in step S640, the communication control unit 230 transmits the distance notification signal to the plurality of vehicles 1A and 1B. When the inter-vehicle distance is too large, there is a possibility that images of a plurality of users cannot be simultaneously captured during traveling in the image capturing area. Accordingly, it is possible to prompt the user to reduce the inter-vehicle distance by transmitting, to a plurality of vehicles, a distance notification signal for notifying that the inter-vehicle distance exceeds a distance of the upper limit of the reference distance range to notify the users.

In step S620, when the acquired inter-vehicle distance does not exceed the distance of the upper limit of the predetermined reference distance range (NO in S620), the determination unit 210 advances the processing to step S650.

In step S650, when the determination unit 210 determined that the acquired inter-vehicle distance is not equal to or less than the distance of the lower limit of the reference distance range (NO in S650), the determination unit 210 returns the processing to step S600 and repeatedly executes the same processing. In this case, the inter-vehicle distance between the plurality of vehicles 1A and 1B is an inter-vehicle distance suitable for image capturing (a distance falling within a predetermined reference distance range), and check processing of the inter-vehicle distance is continuously executed without generating the notification signals (distance notification signal, approach notification signal).

On the other hand, when the acquired inter-vehicle distance is equal to or less than the distance of the lower limit of the predetermined reference distance range in determination in step S650 (YES in S650), the determination unit 210 advances the processing to step S660.

In step S660, the signal generation unit 220 generates an approach notification signal for notifying the user that the inter-vehicle distance is equal to or less than the distance of the lower limit of the reference distance range.

Then, in step S670, the communication control unit 230 transmits the approach notification signal to the plurality of vehicles. When the inter-vehicle distance is too small, there is a possibility that images of a plurality of users cannot be simultaneously captured due to overlap of users during traveling in the image capturing area. Accordingly, it is possible to prompt the user to increase the inter-vehicle distance by transmitting, to a plurality of vehicles, an approach notification signal for notifying that the inter-vehicle distance is equal to or less than a distance of the lower limit of the reference distance range to notify the users.

(Processing of Adjusting Speed Difference between Plurality of Vehicles)

The control device CNT checks the speed difference between the vehicles at the time when the plurality of vehicles 1A and 1B travel in the image capturing area or the predetermined preparation area set before the image capturing area, and transmits the speed notification signal to the plurality of vehicles so as to ensure the speed difference suitable for image capturing (equal to or less than predetermined reference speed).

Figure 7:
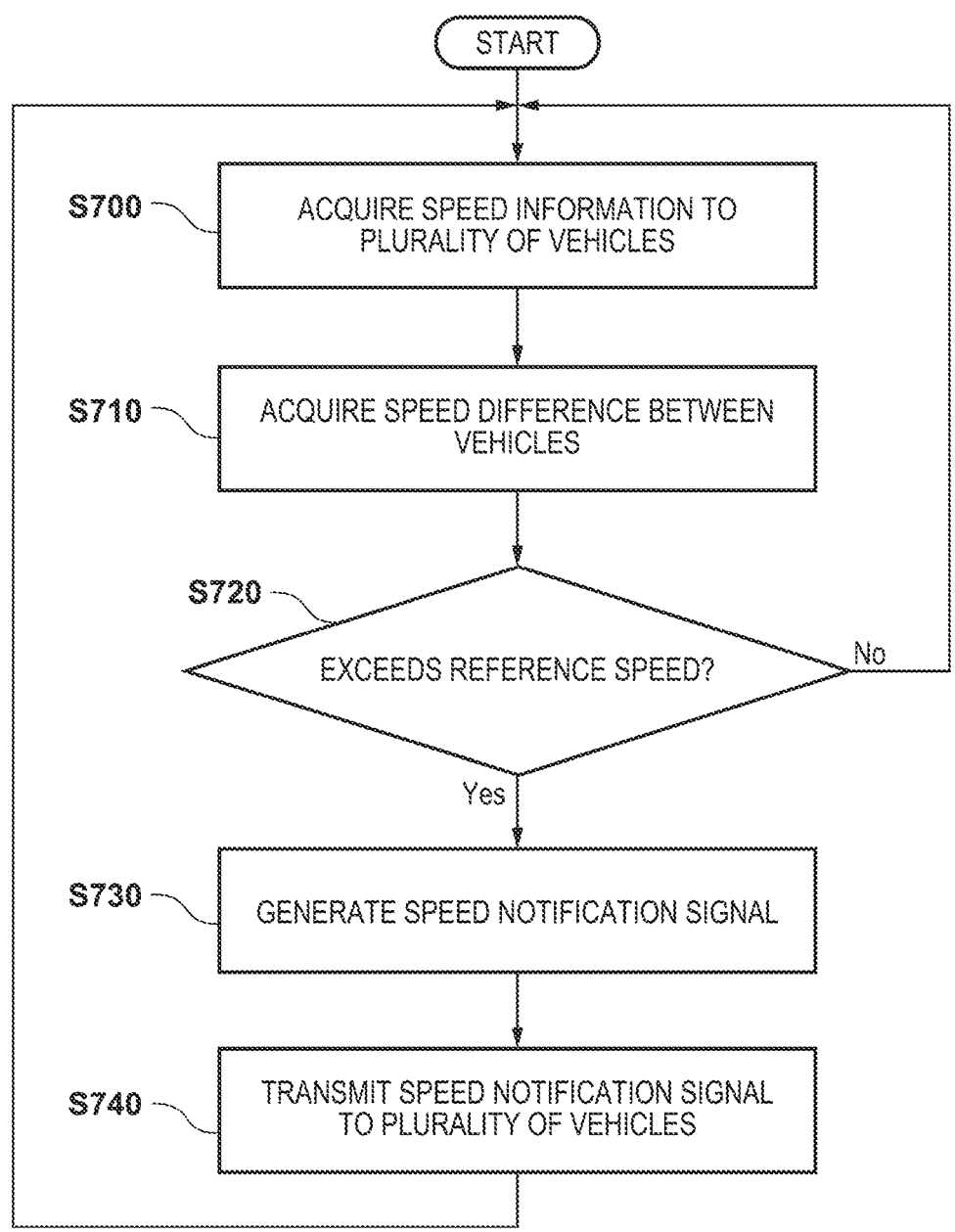
FIG. 7 is a diagram describing a flow of processing of adjusting speed difference between a plurality of vehicles.

FIG. 7 is a diagram describing a flow of processing of adjusting speed difference between a plurality of vehicles. In step S700, the determination unit 210 acquires speed information of the plurality of vehicles 1A and 1B traveling in the image capturing area or a predetermined preparation area set before the image capturing area. In step S710, the determination unit 210 acquires the speed difference between the plurality of vehicles 1A and 1B on the basis of the speed information of the plurality of vehicles 1A and 1B. For example, the determination unit 210 can acquire the speed difference between the vehicles on the basis of the difference in the speed information.

In step S720, when the acquired speed difference does not exceed the reference speed (NO in S720), the determination unit 210 returns the processing to step S700 and repeatedly executes the same processing. In this case, the speed difference between the plurality of vehicles 1A and 1B is a speed difference suitable for image capturing (equal to or less than predetermined reference speed), and check processing of the speed difference is continuously executed without generating the speed notification signal.

On the other hand, when the speed difference exceeds the predetermined reference speed in determination in step S720 (YES in S720), the determination unit 210 advances the processing to step S730.

In step S730, the signal generation unit 220 generates a speed notification signal for notifying the user that the speed difference exceeds the reference speed.

Then, in step S740, the communication control unit 230 transmits the speed notification signal to the plurality of vehicles 1A and 1B.

When the speed difference exceeds the reference speed, there is a possibility that a plurality of users cannot be simultaneously captured during traveling in the image capturing area. Accordingly, it is possible to prompt the user to reduce the speed difference by transmitting, to a plurality of vehicles, the speed notification signal notifying that the speed difference exceeds the reference speed to notify the users.

Second Embodiment

In the first embodiment described above, the users of the plurality of vehicles constituting the subjects are described as the group of targets to be captured, but the configuration of the subject is not limited to this example, and may be, for example, a pedestrian or a user of a single vehicle. In a second embodiment, a configuration in which a pedestrian or a user of a single vehicle is a target to be captured will be described. The configuration of the image capturing system STM, and the functional configurations of the vehicle, the control device CNT and the unmanned aerial vehicle DRN are similar to those in FIGS. 1 and 2. Hereinafter, a portion differs from the first embodiment will be described.

In the second embodiment, the storage unit 22 of the control device CNT registers, as subject information, user information in which a single or a plurality of pedestrians or a user of a single vehicle constituting a subject, is set as a target to be captured. Here, the subject information includes terminal information of the user and vehicle information of the vehicle used by the user. When the subject is a pedestrian, in the subject information, terminal information of the pedestrian is registered in the storage unit 22 as subject information.

The determination unit 210 determines whether the subject is present in the predetermined image capturing area on the basis of the location information of the subject acquired by communication with the terminal of the subject (e.g., SP in FIG. 1) and the map information. That is, the determination unit 210 determines whether or not the subject has entered the predetermined image capturing area (FIG. 3) on the basis of the location information of the subject and the map information. When the determination unit 210 determines that the subject set as the target to be captured has entered the image capturing area, the signal generation unit 220 generates a control signal for instructing start of image capturing, and the communication control unit 230 transmits, to the unmanned aerial vehicle DRN, the control signal generated by the signal generation unit 220 and the subject information.

The identification unit 202 of the unmanned aerial vehicle DRN identifies the subject on the basis of the subject information distributed from the terminal of the subject and the subject information transmitted from the communication control unit 230, and the image capturing control unit 203 of the unmanned aerial vehicle DRN controls the image capturing unit 200 on the basis of the control signal to start capturing an image of the subject.

Further, when the determination unit 210 determines that the subject has entered the image capturing area or the predetermined preparation area set before the image capturing area, the signal generation unit 220 generates an area notification signal for notifying the subject that the subject has entered the image capturing area or the preparation area, and the communication control unit 230 transmits the area notification signal to the subject.

In addition, the control device CNT includes, as a functional configuration, the image processing unit 240 that performs image processing of extracting the face of the subject from the image data captured by the image capturing unit, and an image determination unit 260 that determines whether or not an image of the face of the subject has been captured on the basis of the result of the image processing.

When an image of the face of the subject is not captured in the determination of the image determination unit 260, the signal generation unit 220 generates a parameter control signal for controlling the image capturing parameter of the image capturing unit 200 such that an image of the face of the subject can be captured, and the communication control unit 230 transmits the generated parameter control signal to the unmanned aerial vehicle DRN.

The image capturing control unit 203 of the unmanned aerial vehicle DRN controls the image capturing unit 200 on the basis of the parameter control signal to capture an image of the subject. Furthermore, when an image of the face of the subject has not been captured in the determination of the image determination unit, the signal generation unit 220 generates an image capturing guide signal for guiding the subject to redo image capturing, and the communication control unit 230 transmits the image capturing guide signal to the terminal of the subject. When receiving the image capturing guide signal, the terminal of the subject presents a display based on the image capturing guide signal to the user, and guides the user to capture an image again.

Furthermore, when the subject is a user of a single vehicle, the communication control unit 230 can also transmit an image capturing guide signal to the vehicle of the user who is the subject. When receiving the image capturing guide signal, the display device 17 of the vehicle presents a display based on the image capturing guide signal to the user, and guides the user to capture an image again. In this way, even when images of the face of the user could not be captured, an image can be re-captured immediately in the image capturing area by generating the image capturing guide signal and transmitting the image capturing guide signal to the vehicle.

Summary of Embodiments

The above-described embodiments disclose at least configurations described as follows.

Configuration 1. An image capturing system according to the above embodiment is an image capturing system (e.g., STM in FIG. 1) including; an unmanned aerial vehicle (e.g., DRN in FIG. 1) including an image capturing unit (e.g., 200 in FIG. 1) capable of capturing an image of a subject in a flight state; and a control device (e.g., CNT in FIG. 1) capable of communicating with a terminal of the subject (e.g., SP in FIG. 1) and the unmanned aerial vehicle, in which the control device (CNT) includes:
a storage unit (e.g., 22 in FIG. 1) configured to register subject information in which the subject is set as a target to be captured; a determination unit (e.g., 210 in FIG. 2) configured to determine whether the subject is present in a predetermined image capturing area, on the basis of location information of the subject acquired by communicating with the terminal and map information;
a signal generation unit (e.g., 220 in FIG. 2) configured to generate a control signal that controls the image capturing unit on the basis of determination of the determination unit; and
a communication control unit (e.g., 230 in FIG. 2) configured to transmit the subject information and the control signal to the unmanned aerial vehicle, and
the unmanned aerial vehicle (DRN) further includes:
an identification unit (e.g., 202 in FIG. 2) configured to identify the subject on the basis of subject distributed from the terminal of the subject and the subject information transmitted from the communication control unit; and
an image capturing control unit (e.g., 203 in FIG. 2) configured to control the image capturing unit on the basis of the control signal to control image capturing of the subject identified by the identification unit.

According to the image capturing system of Configuration 1, a technology capable of capturing an image of a subject registered in advance using an unmanned aerial vehicle can be provided.

Configuration 2. In the image capturing system according to the above embodiment, the storage unit registers, as the subject information, group information in which users of a plurality of vehicles constituting the subject are set as a group of targets to be captured, and the determination unit determines, on the basis of location information of the subject and the map information, whether or not the subject is traveling in a predetermined image capturing area.

According to the image capturing system of Configuration 2, an image of a user traveling on a vehicle using users of a plurality of vehicles registered as a group in advance as a subject can be captured using the unmanned aerial vehicle. That is, according to the image capturing system of Configuration 1, images of users traveling in a plurality of vehicles can be simultaneously captured by the unmanned aerial vehicle on the basis of preset group information, and the image capturing system meeting the needs of the users who want to simultaneously capture images in a group.

Configuration 3. In the image capturing system according to the above embodiment, when the determination unit (210) determines that at least one of the plurality of vehicles set as the group has entered the image capturing area, the determination unit determines that the plurality of vehicles is traveling in the image capturing area, the signal generation unit (220) generates a control signal that instructs start of image capturing, and the image capturing control unit (230) controls the image capturing unit (200) on the basis of the control signal to start capturing images of the group of the plurality of vehicles (1A, 1B).

According to the image capturing system of Configuration 3, start timing of image capturing can be controlled, and an image of the vehicle that has entered the image capturing area first can be captured even when the image capturing area is small or the inter-vehicle distance between the vehicles in the group is large.

Configuration 4. In the image capturing system according to the above embodiment, when the determination unit (210) determines that at least one of the plurality of vehicles (1A, 1B) is traveling in the image capturing area, the signal generation unit (220) generates a control signal that instructs continuation of image capturing, the image capturing control unit (230) controls the image capturing unit on the basis of the control signal to continue the image capturing, when the determination unit (210) determines that all of the plurality of vehicles have left the image capturing area, the signal generation unit (220) generates a control signal that instructs end of image capturing, and the image capturing control unit (230) controls the image capturing unit on the basis of the control signal to end the image capturing.

According to the image capturing system of Configuration 4, end timing of image capturing can be controlled, and images of a plurality of vehicles set as a group can be captured without omission.

Configuration 5. In the image capturing system according to the above embodiment, when the determination unit (210) determines that all of the plurality of vehicles (1A, 1B) set as the group have entered the image capturing area, the determination unit determines that the plurality of vehicles (1A, 1B) is traveling in the image capturing area, the signal generation unit (220) generates a control signal that instructs start of image capturing, and the image capturing control unit (230) controls the image capturing unit on the basis of the control signal to start capturing images of the group of the plurality of vehicles.

According to the image capturing system of Configuration 5, start timing of image capturing can be controlled, an image can be captured when all the plurality of vehicles set as the group are in the image capturing area, and only the video that meets the needs of the users can be captured.

Configuration 6. In the image capturing system according to the above embodiment, when the determination unit (210) determines that at least one of the plurality of vehicles (1A, 1B) has entered the image capturing area or a preparation area that is predetermined and set before the image capturing area, the signal generation unit (220) generates an area notification signal that notifies the users that the at least one of the plurality of vehicles has entered the image capturing area or the preparation area, and the communication control unit (230) transmits the area notification signal to the plurality of vehicles.

According to the image capturing system of Configuration 6, traveling in preparation for image capturing can be performed, such as aligning a platoon of vehicles in the group, by notifying the user of the area notification signal before image capturing.

Configuration 7. In the image capturing system according to the above embodiment, the control device (CNT) further includes:

an image processing unit (e.g., 240 in FIG. 2) configured to perform image processing of extracting faces of the users from image data captured by the image capturing unit; and an image determination unit (e.g., 250 in FIG. 2) configured to determine whether or not images of the faces of the users have been captured equivalent to the number of persons se as the group on the basis of a result of the image processing and the group information, and when images of the faces of the users have not been captured equivalent to the number of persons set as the group, the signal generation unit (220) generates a parameter control signal that controls an image capturing parameter of the image capturing unit such that images of the faces of the users can be captured equivalent to the number of persons set as the group, and the image capturing control unit (203) of the unmanned aerial vehicle (DRN)

controls the image capturing unit on the basis of the parameter control signal to perform the image capturing.

According to the image capturing system of Configuration 7, by controlling the image capturing unit on the basis of the parameter control signal, images of the faces of all the members in the group can be captured.

Configuration 8. In the image capturing system according to the above embodiment, when images of the faces of the users have not been captured equivalent to the number of persons set as the group in determination of the image determination unit (250), the signal generation unit (220) generates an image capturing guide signal that guides the users to redo the image capturing, and the communication control unit (230) transmits the image capturing guide signal to the plurality of vehicles (1A, 1B).

According to the image capturing system of Configuration 8, even when images of the faces of all the users could not be captured, an image can be re-captured immediately in the image capturing area by generating the image capturing guide signal for guiding the user to redo image capturing and transmitting the image capturing guide signal to the plurality of vehicles.

Configuration 9, In the image capturing system according to the above embodiment, the determination unit (210)
  acquires an inter-vehicle distance of the plurality of vehicles (1A, 1B) traveling in the image capturing area or the predetermined preparation area set before the image capturing area on the basis of the location information, and when the determination unit determines that the inter-vehicle distance exceeds a distance of an upper limit of a predetermined reference distance range,
  the signal generation unit (220)
  generates a distance notification signal that notifies the users that the inter-vehicle distance exceeds the distance of the upper limit of the reference distance range, and
  the communication control unit (230) transmits the distance notification signal to the plurality of vehicles (1A, 1B).

According to the image capturing system of Configuration 9, when the inter-vehicle distance is too large, there is a possibility that images of the plurality of users cannot be simultaneously captured during traveling in the image capturing area. Accordingly, it is possible to prompt the user to reduce the inter-vehicle distance by transmitting, to a plurality of vehicles, the distance notification signal for notifying that the inter-vehicle distance exceeds a distance of the upper limit of the reference distance range to notify the users.

Configuration 10. In the image capturing system according to the above embodiment, the determination unit (210)
  acquires an inter-vehicle distance of the plurality of vehicles (1A, 1B) traveling in the image capturing area or the predetermined preparation area set before the image capturing area on the basis of the location information, and when the determination unit determines that the inter-vehicle distance is equal to or less than a distance of a lower limit of a predetermined reference distance range,
  the signal generation unit (220)
  generates an approach notification signal that notifies the users that the inter-vehicle distance is equal to or less than the distance of the lower limit of the reference distance range, and
  the communication control unit (230) transmits the approach notification signal to the plurality of vehicles (1A, 1B).

According to the image capturing system of Configuration 10, when the inter-vehicle distance is too small, there is a possibility that images of the plurality of users cannot be simultaneously captured due to overlap of the users during traveling in the image capturing area. Accordingly, it is possible to prompt the user to increase the inter-vehicle distance by transmitting, to the plurality of vehicles, the approach notification signal for notifying that the inter-vehicle distance is equal to or less than a distance of the lower limit of the reference distance range to notify the users.

Configuration 11. In the image capturing system according to the above embodiment, the plurality of vehicles (1A, 1B) each includes:
  an acquisition unit (e.g., the communication device 15 and the detection device 16 in FIG. 1) acquires location information of the vehicle;
  a vehicle communication unit (e.g., the communication device 15 in FIG. 1) configured to transmit location information of the vehicle; and
  a detection unit (e.g., 16 in FIG. 1) configured to detect speed information of the vehicle,
  the vehicle communication unit (15) transmits the speed information to the control device,
  the determination unit (210) of the control device (CNT) acquires
  a speed difference of the plurality of vehicles (1A, 1B) traveling in the image capturing area or the predetermined preparation area set before the image capturing area on the basis of the speed information, and when the determination unit determines that the predetermined speed difference exceeds reference speed,
  the signal generation unit (220)
  generates a speed notification signal that notifies the users that the speed difference exceeds the reference speed, and
  the communication control unit (230) transmits the speed notification signal to the plurality of vehicles.

According to the image capturing system of Configuration 11, when the speed difference exceeds the reference speed, there is a possibility that the plurality of users cannot be simultaneously captured during traveling in the image capturing area. Accordingly, it is possible to prompt the user to reduce the speed difference by transmitting, to the plurality of vehicles, the speed notification signal for notifying that the speed difference exceeds the reference speed to notify the users.

Configuration 12. In the image capturing system according to the above embodiment, the control device (CNT) further includes:
  a backlight determination unit (e.g., 260 in FIG. 2) configured to determine whether or not image capturing condition is backlight condition on the basis of image data captured by the image capturing unit, and
  when the image capturing condition is determined to be the backlight condition, the signal generation unit (220) generates a flight control signal that instructs a change in a flight position of the unmanned aerial vehicle such that the unmanned aerial vehicle avoids the backlight,
  the communication control unit (230) transmits the flight control signal to the unmanned aerial vehicle, and a flight control unit (e.g., 207 in FIG. 2) of the unmanned aerial vehicle (DRN) changes the flight position on the basis of the flight control signal.

According to the image capturing system of Configuration 12, when it is determined that image capturing condition is backlight condition on the basis of the captured image data, an image can be captured while avoiding backlight by changing the flight position of the unmanned aerial vehicle.

Configuration 13. In the image capturing system according to the above embodiment, when the image capturing condition is determined to be the backlight condition, the signal generation unit (220) generates a parameter control signal that performs control to move an angle of view of the image capturing unit (200) in a horizontal direction or control to move the angle of view of the image capturing unit (200) in a vertical direction, the communication control unit (230) transmits the parameter control signal to the unmanned aerial vehicle, and the image capturing control unit (203) of the unmanned aerial vehicle (DRN)

changes the angle of view of the image capturing unit (200) on the basis of the parameter control signal.

According to the image capturing system of Configuration 13, when it is determined that image capturing condition is backlight condition on the basis of the captured image data, an image can be captured while avoiding backlight by changing the angle of view of the image capturing unit.

Configuration 14. In the image capturing system according to the above embodiment, the storage unit (22) registers, as the subject information, user information in which a pedestrian or a user of a single vehicle constituting the subject is set as a target to be captured, and the determination unit (210) determines whether or not the subject has entered the predetermined image capturing area, on the basis of the location information of the subject and the map information.

According to the image capturing system of Configuration 14, a technology capable of capturing an image of a pedestrian or a user of a single vehicle by an unmanned aerial vehicle, using the pedestrian or the user of the single vehicle registered in advance as a subject can be provided.

Configuration 15. In the image capturing system according to the above embodiment, when the determination unit (210) determines that the subject set as the target to be captured has entered the image capturing area, the signal generation unit (220) generates a control signal that instructs start of image capturing, and the image capturing control unit (203) controls the image capturing unit (200) on the basis of the control signal to start capturing images of the subject.

According to the image capturing system of Configuration 15, start timing of image capturing can be controlled. In this way, even when the image capturing area is small, an image of the subject can be captured without missing the timing of image capturing.

Configuration 16. In the image capturing system according to the above embodiment, when the determination unit (200) determines that the subject has entered the image capturing area or the predetermined preparation area set before the image capturing area, the signal generation unit (220) generates an area notification signal that notifies the subject that the subject has entered the image capturing area or the preparation area, and the communication control unit (230) transmits the area notification signal to the subject.

According to the image capturing system of Configuration 16, notifying the subject of the area notification signal before image capturing allows the subject to prepare for image capturing in advance.

Configuration 17. In the image capturing system according to the above embodiment, the control device (CNT) further includes:

an image processing unit (e.g., 240 in FIG. 2) configured to perform image processing of extracting a face of the subject from image data captured by the image capturing unit (200); and an image determination unit (e.g., 250 in FIG. 2) configured to determine whether or not an image of the face of the subject has been captured on the basis of a result of the image processing, when an image of the face of the subject has not been captured, the signal generation unit (220) generates a parameter control signal that controls an image capturing parameter of the image capturing unit (200) such that an image of the face of the subject can be captured, and the image capturing control unit (203) of the unmanned aerial vehicle (DRN)

controls the image capturing unit (200) on the basis of the parameter control signal to perform the image capturing.

According to the image capturing system of Configuration 17, by controlling the image capturing unit on the basis of the parameter control signal, an image of the face of the subject can be captured.

Configuration 18. In the image capturing system according to the above embodiment, when an image of the face of the subject has not been captured in determination of the image determination unit (250), the signal generation unit (220) generates an image capturing guide signal that guides the subject to redo the image capturing, and the communication control unit (230) transmits the image capturing guide signal to the subject.

According to the image capturing system of Configuration 18, even when an image of the face of the subject could not be captured, an image can be re-captured immediately in the image capturing area by generating the image capturing guide signal for guiding the subject to redo image capturing and transmitting the image capturing guide signal to the subject.

Configuration 19. A control device according to the above embodiment is a control device (e.g., CNT in FIG. 1) capable of communicating with an unmanned aerial vehicle (e.g., DRN in FIG. 1) including an image capturing unit (e.g., 200 in FIG. 2) capable of capturing an image of a subject in a flight state, and the control device includes:

a storage unit (e.g., 22 in FIG. 1) configured to register subject information in which the subject is set as a target to be captured;

a determination unit (e.g., 210 in FIG. 2) configured to determine whether the subject is present in a predetermined image capturing area, on the basis of location information of the subject and map information;

a signal generation unit (e.g., 220 in FIG. 2) configured to generate a control signal that controls the image capturing unit on the basis of determination of the determination unit; and a communication control unit (e.g., 230 in FIG. 2) configured to transmit the subject information and the control signal to the unmanned aerial vehicle.

Configuration 20. A control method according to the above embodiment is a control method in a control device capable of communicating with an unmanned aerial vehicle including an image capturing unit capable of capturing an image of a subject in a flight state, and the control method includes:

a storing step (e.g., S400 in FIG. 4) of registering, to a storage unit (22), subject information in which the subject is set as a target to be captured;

a determining step (e.g., S415 in FIG. 4) in which a determination unit (210) determines whether the subject is present in a predetermined image capturing area, on the basis of location information of the subject and map information;

a signal generating step (e.g., S420 in FIG. 4) in which a signal generation unit (220) generates a control signal that controls the image capturing unit on the basis of determination in the determining step; and a communication controlling step (e.g., S425 in FIG. 4) in which a communication control unit (230) transmits the subject information and the control signal to the unmanned aerial vehicle.

Configuration 21. A storage medium according to the above embodiment is a computer-readable storage medium storing a program causing a computer to execute each step of a control method in a control device capable of communicating with an unmanned aerial vehicle including an image capturing unit capable of capturing an image of a subject in a flight state, in which the control method includes:

a storing step (e.g., S400 in FIG. 4) of registering, to a storage unit (22), subject information in which the subject is set as a target to be captured;

a determining step (e.g., S415 in FIG. 4) in which a determination unit (210) determines whether the subject is present in a predetermined image capturing area, on the basis of location information of the subject and map information;

a signal generating step (e.g., S420 in FIG. 4) in which a signal generation unit (220) generates a control signal that controls the image capturing unit on the basis of determination in the determining step; and a communication controlling step (e.g., S425 in FIG. 4) in which a communication control unit (230) transmits the subject information and the control signal to the unmanned aerial vehicle.

According to the control device of Configuration 19, the control method of Configuration 20 and the storage medium of Configuration 21, a control technology for capturing an image of a subject registered in advance by using an unmanned aerial vehicle can be provided.

The invention is not limited to the foregoing embodiments, and various variations/changes are possible within the spirit of the invention.

What is claimed is:

1. An image capturing system comprising: an unmanned aerial vehicle including an image capturing camera capable of capturing an image of a subject in a flight state; and a controller capable of communicating with a terminal of the subject and the unmanned aerial vehicle, wherein the controller includes:
at least one processor circuit with a storage memory comprising instructions, that when executed by the at least one processor circuit, cause the at least one processor circuit to at least:
register, to the storage memory, subject information in which the subject is set as a target to be captured, wherein the storage memory registers, as the subject information, group information in which users of a plurality of vehicles constituting the subject are set as a group of targets to be captured;
determine whether or not the subject is traveling in a predetermined image capturing area, on the basis of location information of the subject acquired by communicating with the terminal and map information;
generate a control signal that controls the image capturing camera on the basis of determination of whether or not the subject is traveling in the predetermined image capturing area; and
transmit the subject information and the control signal to the unmanned aerial vehicle, and the unmanned aerial vehicle further includes:
at least one processor circuit with a memory comprising instructions, that when executed by the at least one processor circuit, cause the at least one processor circuit to at least: identify the subject on the basis of subject information distributed from the terminal of the subject and the subject information transmitted from the controller; and
control the image capturing camera on the basis of the control signal to control image capturing of the identified subject.

2. The image capturing system according to claim 1, wherein,
when the instructions, when executed by the at least one processor circuit of the controller, further cause the at least one processor circuit to: determine that at least one of the plurality of vehicles set as the group has entered the image capturing area,
the instructions, when executed by the at least one processor circuit of the controller, further cause the at least one processor circuit to:
determine that the plurality of vehicles is traveling in the image capturing area,
generate a control signal that instructs start of image capturing, and
the instructions, when executed by the at least one processor circuit of the unmanned aerial vehicle, further cause the at least one processor circuit to: control image capturing camera on the basis of the control signal to start capturing images of the group of the plurality of vehicles.

3. The image capturing system according to claim 2, wherein
when the instructions, when executed by the at least one processor circuit of the controller, further cause the at least one processor circuit to: determine that at least one of the plurality of vehicles is traveling in the image capturing area,
the instructions, when executed by the at least one processor circuit of the controller, further cause the at least one processor circuit to: generate a control signal that instructs continuation of image capturing,
the instructions, when executed by the at least one processor circuit of the unmanned aerial vehicle, further cause the at least one processor circuit to:
control the image capturing camera on the basis of the control signal to continue the image capturing,
when the instructions, when executed by the at least one processor circuit of the controller, further cause the at least one processor circuit to: determine that all of the plurality of vehicles have left the image capturing area,
the instructions, when executed by the at least one processor circuit of the controller, further cause the at least one processor circuit to:
generate a control signal that instructs end of image capturing, and
the instructions, when executed by the at least one processor circuit of the unmanned aerial vehicle, further cause the at least one processor circuit to:
control the image capturing camera on the basis of the control signal to end the image capturing.

4. The image capturing system according to claim 1, wherein,
when the instructions, when executed by the at least one processor circuit of the controller, further cause the at least one processor circuit to: determine that all of the plurality of vehicles set as the group have entered the image capturing area,
the instructions, when executed by the at least one processor circuit of the controller, further cause the at least one processor circuit to: determine that the plurality of vehicles is traveling in the image capturing area,
generate a control signal that instructs start of image capturing, and
the instructions, when executed by the at least one processor circuit of the unmanned aerial vehicle, further cause the at least one processor circuit to:
control the image capturing camera on the basis of the control signal to start capturing images of the group of the plurality of vehicles.

5. The image capturing system according to claim 1, wherein,
when the instructions, when executed by the at least one processor circuit of the controller, further cause the at least one processor circuit to: determine that at least one of the plurality of vehicles has entered the image capturing area or a predetermined preparation area set before the image capturing area,
the instructions, when executed by the at least one processor circuit of the controller, further cause the at least one processor circuit to:
generate an area notification signal that notifies the users that the at least one of the plurality of vehicles has entered the image capturing area or the preparation area, and
transmit the area notification signal to the plurality of vehicles.

6. The image capturing system according to claim 1, wherein
the instructions, when executed by the at least one processor circuit of the controller, further cause the at least one processor circuit to:
perform image processing of extracting faces of the users from image data captured by the image capturing camera; and
determine whether or not images of the faces of the users have been captured equivalent to the number of persons set as the group on the basis of a result of the image processing and the group information, and
when images of the faces of the users have not been captured equivalent to the number of persons set as the group,
the instructions, when executed by the at least one processor circuit of the controller, further cause the at least one processor circuit to:
generate a parameter control signal that controls an image capturing parameter of the image capturing camera such that images of the faces of the users can be captured equivalent to the number of persons set as the group, and
the instructions, when executed by the at least one processor circuit of the unmanned aerial vehicle, further cause the at least one processor circuit to:
control the image capturing camera on the basis of the parameter control signal to perform the image capturing.

7. The image capturing system according to claim 6, wherein,
when the images of the faces of the users have not been captured equivalent to the number of persons set as the group in determination of the images of the faces of the users,
the instructions, when executed by the at least one processor circuit of the controller, further cause the at least one processor circuit to:
generate an image capturing guide signal that guides the users to redo the image capturing, and
transmit the image capturing guide signal to the plurality of vehicles.

8. The image capturing system according to claim 1, wherein
the instructions, when executed by the at least one processor circuit of the controller, further cause the at least one processor circuit to:
acquire an inter-vehicle distance of the plurality of vehicles traveling in the image capturing area or the predetermined preparation area set before the image capturing area on the basis of the location information, and
when the instructions, when executed by the at least one processor circuit of the controller, further cause the at least one processor circuit to: determine that the inter-vehicle distance exceeds a distance of an upper limit of a predetermined reference distance range,
the instructions, when executed by the at least one processor circuit of the controller, further cause the at least one processor circuit to:
generate a distance notification signal that notifies the users that the inter-vehicle distance exceeds the distance of the upper limit of the reference distance range, and
transmit the distance notification signal to the plurality of vehicles.

9. The image capturing system according to claim 1, wherein
the instructions, when executed by the at least one processor circuit of the controller, further cause the at least one processor circuit to:
acquire an inter-vehicle distance of the plurality of vehicles traveling in the image capturing area or the predetermined preparation area set before the image capturing area on the basis of the location information, and
when the instructions, when executed by the at least one processor circuit of the controller, further cause the at least one processor circuit to: determine that the inter-vehicle distance is equal to or less than a distance of a lower limit of a predetermined reference distance range,
the instructions, when executed by the at least one processor circuit of the controller, further cause the at least one processor circuit to:
generate an approach notification signal that notifies the users that the inter-vehicle distance is equal to or less than the distance of the lower limit of the reference distance range, and
transmit the approach notification signal to the plurality of vehicles.

10. The image capturing system according to claim 1, wherein
the plurality of vehicles each includes:
at least one processor circuit with a memory comprising instructions, that when executed by the at least one processor circuit, cause the at least one processor circuit to at least:
acquire location information of the vehicle;
transmit location information of the vehicle;
detect speed information of the vehicle, and
transmit the speed information to the controller,
the instructions, when executed by the at least one processor circuit of the controller, further cause the at least one processor circuit to: acquire a speed difference of the plurality of vehicles traveling in the image capturing area or the predetermined preparation area set before the image capturing area on the basis of the speed information, and
when the instructions, when executed by the at least one processor circuit of the controller, further cause the at least one processor circuit to:
determine that the speed difference exceeds predetermined reference speed,
wherein the instructions, when executed by the at least one processor circuit of the controller, further cause the at least one processor circuit to:
generate a speed notification signal that notifies the users that the speed difference exceeds the reference speed, and
transmit the speed notification signal to the plurality of vehicles.

11. The image capturing system according to claim 1, wherein
the instructions, when executed by the at least one processor circuit of the controller, further cause the at least one processor circuit to:
determine whether or not image capturing condition is backlight condition on the basis of image data captured by the image capturing camera, and
when the image capturing condition is determined to be the backlight condition,
the instructions, when executed by the at least one processor circuit of the controller, further cause the at least one processor circuit to:
generate a flight control signal that instructs a change in a flight position of the unmanned aerial vehicle such that the unmanned aerial vehicle avoids the backlight,
transmit the flight control signal to the unmanned aerial vehicle, and
a flight controller of the unmanned aerial vehicle changes the flight position on the basis of the flight control signal.

12. The image capturing system according to claim 11, wherein,
when the image capturing condition is determined to be the backlight condition, the instructions, when executed by the at least one processor circuit of the controller, further cause the at least one processor circuit to:
generate a parameter control signal that performs control to move an angle of view of the image capturing camera in a horizontal direction or control to move the angle of view of the image capturing camera in a vertical direction,
transmit the parameter control signal to the unmanned aerial vehicle, and
the instructions, when executed by the at least one processor circuit of the unmanned aerial vehicle, further cause the at least one processor circuit to:
change the angle of view of the image capturing camera on the basis of the parameter control signal.

13. The image capturing system according to claim 1, wherein
the storage memory registers, as the subject information, user information in which a pedestrian or a user of a single vehicle constituting the subject is set as a target to be captured, and
the instructions, when executed by the at least one processor circuit of the controller, further cause the at least one processor circuit to:
determine whether or not the subject has entered the predetermined image capturing area, on the basis of the location information of the subject and the map information.

14. The image capturing system according to claim 13, wherein,
when the instructions, when executed by the at least one processor circuit of the controller, further cause the at least one processor circuit to:
determine that the subject set as the target to be captured has entered the image capturing area,
the instructions, when executed by the at least one processor circuit of the controller, further cause the at least one processor circuit to:
generate a control signal that instructs start of image capturing, and
the instructions, when executed by the at least one processor circuit of the unmanned aerial vehicle, further cause the at least one processor circuit to: control the image capturing camera on the basis of the control signal to start capturing images of the subject.

15. The image capturing system according to claim 13, wherein,
when the instructions, when executed by the at least one processor circuit of the controller, further cause the at least one processor circuit to: determine that the subject has entered the image capturing area or the predetermined preparation area set before the image capturing area,
the instructions, when executed by the at least one processor circuit of the controller, further cause the at least one processor circuit to:
generate an area notification signal that notifies the subject that the subject has entered the image capturing area or the preparation area, and
transmit the area notification signal to the subject.

16. The image capturing system according to claim 13, wherein
the instructions, when executed by the at least one processor circuit of the controller, further cause the at least one processor circuit to:
perform image processing of extracting a face of the subject from image data captured by the image capturing camera; and
determine whether or not an image of the face of the subject has been captured on the basis of a result of the image processing,
when an image of the face of the subject has not been captured, the instructions, when executed by the at least one processor circuit of the controller, further cause the at least one processor circuit to: generate a parameter control signal that controls an image capturing parameter of the image capturing camera such that an image of the face of the subject can be captured, and
the instructions, when executed by the at least one processor circuit of the unmanned aerial vehicle, further cause the at least one processor circuit to: control the image capturing camera on the basis of the parameter control signal to perform the image capturing.

17. The image capturing system according to claim 16, wherein,
when the image of the face of the subject has not been captured in determination of the image of the face of the subject,
the instructions, when executed by the at least one processor circuit of the controller, further cause the at least one processor circuit to:

generate an image capturing guide signal that guides the subject to redo the image capturing, and transmit the image capturing guide signal to the subject.

18. A controller capable of communicating with an unmanned aerial vehicle including an image capturing camera capable of capturing an image of a subject in a flight state, the controller comprising:

at least one processor circuit with a storage memory comprising instructions, that when executed by the at least one processor circuit, cause the at least one processor circuit to at least:

register, to the storage memory, subject information in which the subject is set as a target to be captured, wherein the storage memory registers, as the subject information, group information in which users of a plurality of vehicles constituting the subject are set as a group of targets to be captured;

determine whether or not the subject is traveling in a predetermined image capturing area, on the basis of location information of the subject and map information;

generate a control signal that controls the image capturing camera on the basis of determination of whether or not the subject is traveling in the predetermined image capturing area; and transmit the subject information and the control signal to the unmanned aerial vehicle.

19. A control method in a controller capable of communicating with an unmanned aerial vehicle including an image capturing camera capable of capturing an image of a subject in a flight state, the method comprising:

a storing step of registering, to a storage memory, subject information in which the subject is set as a target to be captured, wherein the storage memory registers, as the subject information, group information in which users of a plurality of vehicles constituting the subject are set as a group of targets to be captured;

a determining step of determining whether or not the subject is traveling in a predetermined image capturing area, on the basis of location information of the subject and map information;

a signal generating step of generating a control signal that controls the image capturing camera on the basis of determination in the determining step; and a communication controlling step of transmitting the subject information and the control signal to the unmanned aerial vehicle.

20. A non-transitory computer-readable storage medium storing a program causing a computer to execute each step of a control method in a controller capable of communicating with an unmanned aerial vehicle including an image capturing camera capable of capturing an image of a subject in a flight state, wherein the control method includes:

a storing step of registering, to a storage memory, subject information in which the subject is set as a target to be captured, wherein the storage memory registers, as the subject information, group information in which users of a plurality of vehicles constituting the subject are set as a group of targets to be captured;

a determining step of determining whether or not the subject is traveling in a predetermined image capturing area, on the basis of location information of the subject and map information;

a signal generating step of generating a control signal that controls the image capturing camera on the basis of determination in the determining step; and a communication controlling step of transmitting the subject information and the control signal to the unmanned aerial vehicle.

* * * * *